US011181470B2

(12) United States Patent
Takashima

(10) Patent No.: US 11,181,470 B2
(45) Date of Patent: Nov. 23, 2021

(54) SENSING SYSTEM, SENSING METHOD, AND SENSING DEVICE

(71) Applicant: Sony Group Corporation, Tokyo (JP)

(72) Inventor: Masatoshi Takashima, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/301,624

(22) PCT Filed: Jun. 12, 2017

(86) PCT No.: PCT/JP2017/021607
§ 371 (c)(1),
(2) Date: Nov. 14, 2018

(87) PCT Pub. No.: WO2017/221756
PCT Pub. Date: Dec. 28, 2017

(65) Prior Publication Data
US 2019/0285541 A1    Sep. 19, 2019

(30) Foreign Application Priority Data

Jun. 22, 2016 (JP) .............................. JP2016-123596

(51) Int. Cl.
G01N 21/27      (2006.01)
G06K 9/00       (2006.01)
(Continued)

(52) U.S. Cl.
CPC ............. G01N 21/27 (2013.01); G01N 21/25 (2013.01); G01N 21/274 (2013.01); G01N 21/84 (2013.01);
(Continued)

(58) Field of Classification Search
CPC ...... G01N 21/27; G01N 21/25; G01N 21/274; G01N 21/84; G01N 21/31;
(Continued)

(56) References Cited

U.S. PATENT DOCUMENTS

2012/0155714 A1*  6/2012  Douglass .......... G06K 9/00657
                                                     382/110
2015/0130936 A1*  5/2015  Coram .............. B64C 39/022
                                                     348/144
2016/0283791 A1*  9/2016  Ogura .................. G01J 3/513

FOREIGN PATENT DOCUMENTS

JP    2003-009664 A    1/2003
JP    2005062095 A     3/2005
(Continued)

OTHER PUBLICATIONS

Extended European Search Report dated Apr. 26, 2019 for corresponding European Application No. 17815225.2.
(Continued)

Primary Examiner — Jamil Ahmed
(74) Attorney, Agent, or Firm — Michael Best & Friedrich LLP

(57) ABSTRACT

The present technology relates to a sensing system, a sensing method, and a sensing device which are capable of performing measurement with higher accuracy.
A sensing system is configured such that a plurality of reference reflection regions having a reflectance corresponding to an inspection target are prepared for each wavelength band which is a target for sensing of the inspection target as reference reflection regions, and is configured to sense the reference reflection region having a reflectance corresponding to the inspection target for each wavelength band which is a target for sensing of the inspection target at the time of sensing a region including the inspection target and the reference reflection region. The present technology can be applied to a system for measuring a vegetation index such as a normalized difference vegetation index (NDVI).

21 Claims, 19 Drawing Sheets

(51) Int. Cl.
  *G01N 21/84*    (2006.01)
  *G01N 21/25*    (2006.01)
  *G06T 1/00*     (2006.01)
  *G01N 21/31*    (2006.01)
  *G01N 21/17*    (2006.01)

(52) U.S. Cl.
  CPC ............ *G06K 9/00657* (2013.01); *G06T 1/00* (2013.01); *G01N 21/31* (2013.01); *G01N 2021/1793* (2013.01); *G01N 2021/8466* (2013.01); *G06K 2009/00644* (2013.01)

(58) Field of Classification Search
  CPC ... G01N 2021/1793; G01N 2021/8466; G06K 9/00657; G06K 2009/00644; G06T 1/00
  See application file for complete search history.

(56) References Cited

FOREIGN PATENT DOCUMENTS

| | | |
|---|---|---|
| JP | 2010-044623 A | 2/2010 |
| WO | 2010/144877 A1 | 12/2010 |
| WO | 2013/161664 A | 10/2013 |

OTHER PUBLICATIONS

Japanese Office Action dated May 11, 2021 for corresponding Japanese Application No. 2018-523889.

\* cited by examiner

SENSING SYSTEM, SENSING METHOD, AND SENSING DEVICE

TECHNICAL FIELD

The present technology relates to a sensing system, a sensing method, and a sensing device, and more particularly, to a sensing system, a sensing method, and a sensing device which are capable of performing measurement with higher accuracy.

BACKGROUND ART

Hitherto, inspection devices performing inspection of conditions, activity levels, and the like of plants growing in a certain place have become known (see, for example, Patent Literature 1).

CITATION LIST

Patent Literature

Patent Literature 1: JP 2003-9664A

DISCLOSURE OF INVENTION

Technical Problem

Incidentally, when the measurement of an inspection index of an inspection target is performed, a reference reflection region may be used in order to correct for a change in a measurement light source during the measurement. However, a difference in reflectance from the reference reflection region may become large depending on reflectance spectral characteristics of the inspection target, and thus there is a likelihood that measurement may not be able to be performed with high accuracy.

The present technology is contrived in view of such circumstances, and makes it possible to perform measurement of an inspection index of an inspection target with higher accuracy when performing the measurement using a reference reflection region.

Solution to Problem

A sensing system according to an aspect of the present technology is a sensing system including a sensor which senses a plurality of reference reflection regions having characteristics according to an inspection target, corresponding to a plurality of wavelength bands which are targets for sensing of the inspection target, and having different reflectances, and a region including the inspection target.

A sensing method according to an aspect of the present technology is a sensing method for a sensing system including a sensor, the sensing method including a step of causing the sensor to sense a plurality of reference reflection regions having characteristics according to an inspection target, corresponding to a plurality of wavelength bands which are targets for sensing of the inspection target, and having different reflectances, and a region including the inspection target.

A sensing device according to an aspect of the present technology is a sensing device including a sensor which senses a plurality of reference reflection regions having characteristics according to an inspection target, corresponding to a plurality of wavelength bands which are targets for sensing of the inspection target, and having different reflectances, and a region including the inspection target.

Note that the sensing device according to the aspect of the present technology may be an independent device or may be an internal block constituting one device.

In the sensing system, the sensing method, and the sensing device according to the aspects of the present technology, a plurality of reference reflection regions having characteristics according to an inspection target, corresponding to a plurality of wavelength bands which are targets for sensing of the inspection target, and having different reflectances, and a region including the inspection target are sensed.

Advantageous Effects of Invention

According to the aspects of the present technology, it is possible to perform measurement with higher accuracy.

Moreover, the advantageous effects mentioned here are not necessarily limited and any advantageous effect described in the present disclosure may be obtained.

MODE(S) FOR CARRYING OUT THE INVENTION

Figure 1:
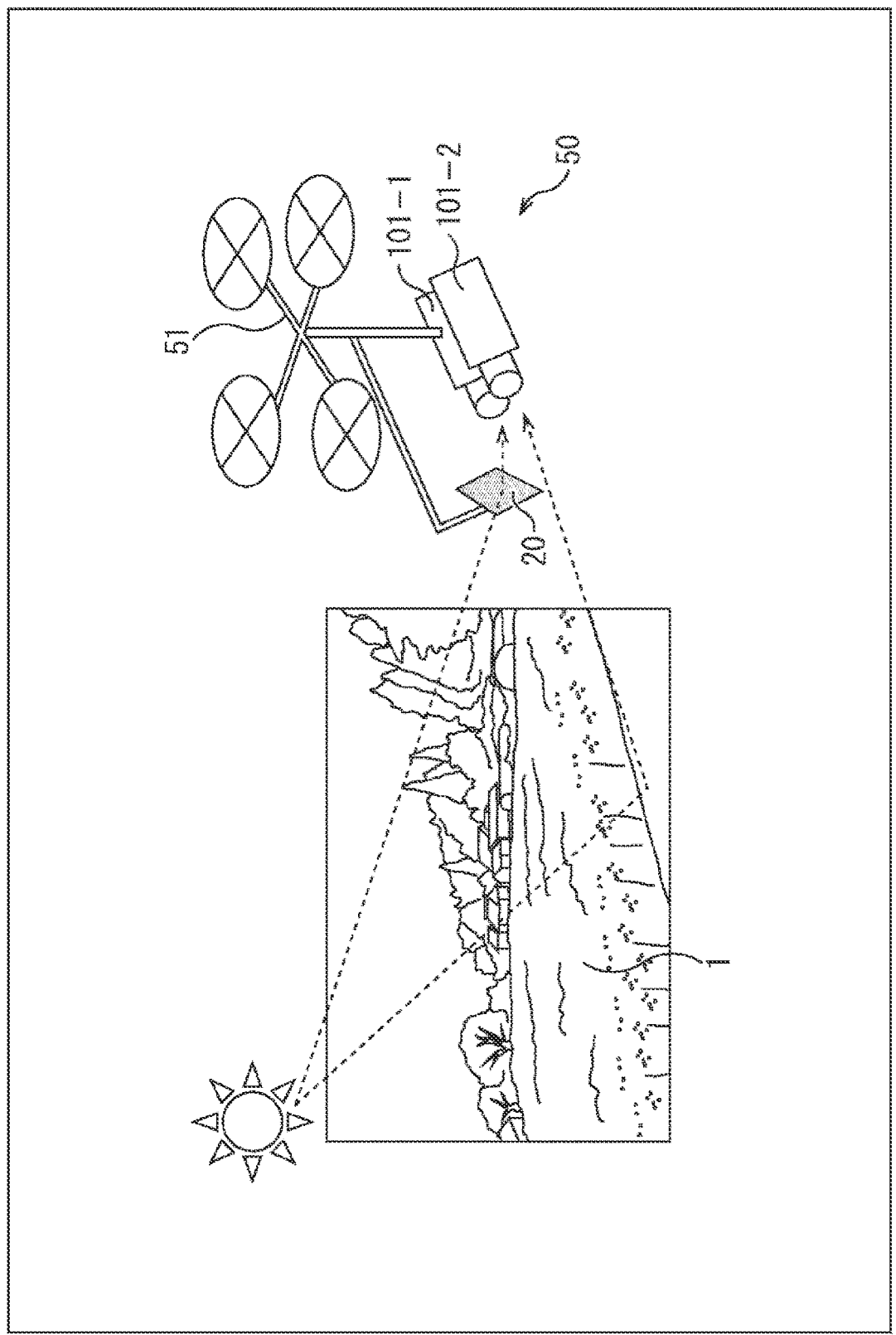
FIG. 1 is a diagram illustrating an example of measurement performed by a mobile measuring device.

Hereinafter, embodiments of the present technology will be described with reference to the drawings. Moreover, the description will be made in the following order.
1. Outline of the present technology
2. Configuration of system
3. Example of measurement of sensing device
4. Inspection index measurement process
5. Modification examples
6. Configuration of computer

1. Outline of the Present Technology (Measurement of Movement Measurement Device)

FIG. 1 is a diagram illustrating an example of measurement of a mobile measuring device performing movement observation.

In FIG. 1, a mobile measuring device 50, which is, for example, an unmanned aerial vehicle (UAV), flies by the rotation of a rotary wing 2 having a propeller shape and senses (aerial imaging) a region including an inspection target 1 such as plants in a field from the sky.

The mobile measuring device 50 includes a sensing device 101-1 and a sensing device 101-2. A reference reflecting plate 20 having a predetermined shape (for example, a rectangular shape) is installed in front of the sensing device 101-1 and the sensing device 101-2.

Thereby, in the mobile measuring device 50, the inspection target 1 such as plants in a field and the reference reflecting plate 20 are present within the same angle of view as objects (subjects) to be sensed by the sensing device 101-1 and the sensing device 101-2. For example, a gray reflecting plate having a fixed reflectance can be used as the reference reflecting plate 20.

That is, for example, in a case where the plants in the field illustrated in FIG. 1 are set to be the inspection target 1, it is necessary to simultaneously sense the reference reflecting plate 20 having a known reflectance and the inspection target 1 in order to correct conditions of a light source such as sunlight. It is possible to obtain an inspection index of the inspection target 1 on the basis of measurement values obtained by the sensing of the sensing device 101-1 and the sensing device 101-2.

As the inspection index of the inspection target 1, for example, a normalized difference vegetation index (NDVI) can be obtained. The normalized difference vegetation index (NDVI) is an index indicating a distribution state and an activity level of vegetation. Note that the normalized difference vegetation index (NDVI) is an example of a vegetation index. Hereinafter, the normalized difference vegetation index (NDVI) is also referred to as an NDVI value.

Since the NDVI value is calculated by the following Expression (1), for example, it is necessary to sense a component in an infrared region (Near Infrared: NIR) using the sensing device 101-1 and to sense a red (R) component in a visible region using the sensing device 101-2.

$$NDVI=(IR-R)/(IR+R)=(1-R/IR)/(1+R/IR) \quad (1)$$

This is provided that, in Expression (1), IR represents a reflectance in an infrared region (NIR), and R represents a reflectance of red (R) in a visible region.

Here, in the sensing device 101-1 and the sensing device 101-2, in a case where a reflectance spectral characteristic of the inspection target 1 change very little in the visible region and changes extremely greatly in the infrared region when the reflectance spectral characteristic of the inspection target 1 is measured like, for example, plants, a difference in reflectance from the reference reflecting plate 20 becomes large, and thus it becomes difficult to set an optimal exposure time for each wavelength band (measurement band) of a measurement target. Hereinafter, the reason for this will be described.

(Sensing Result of NIR Component)

Figure 2:
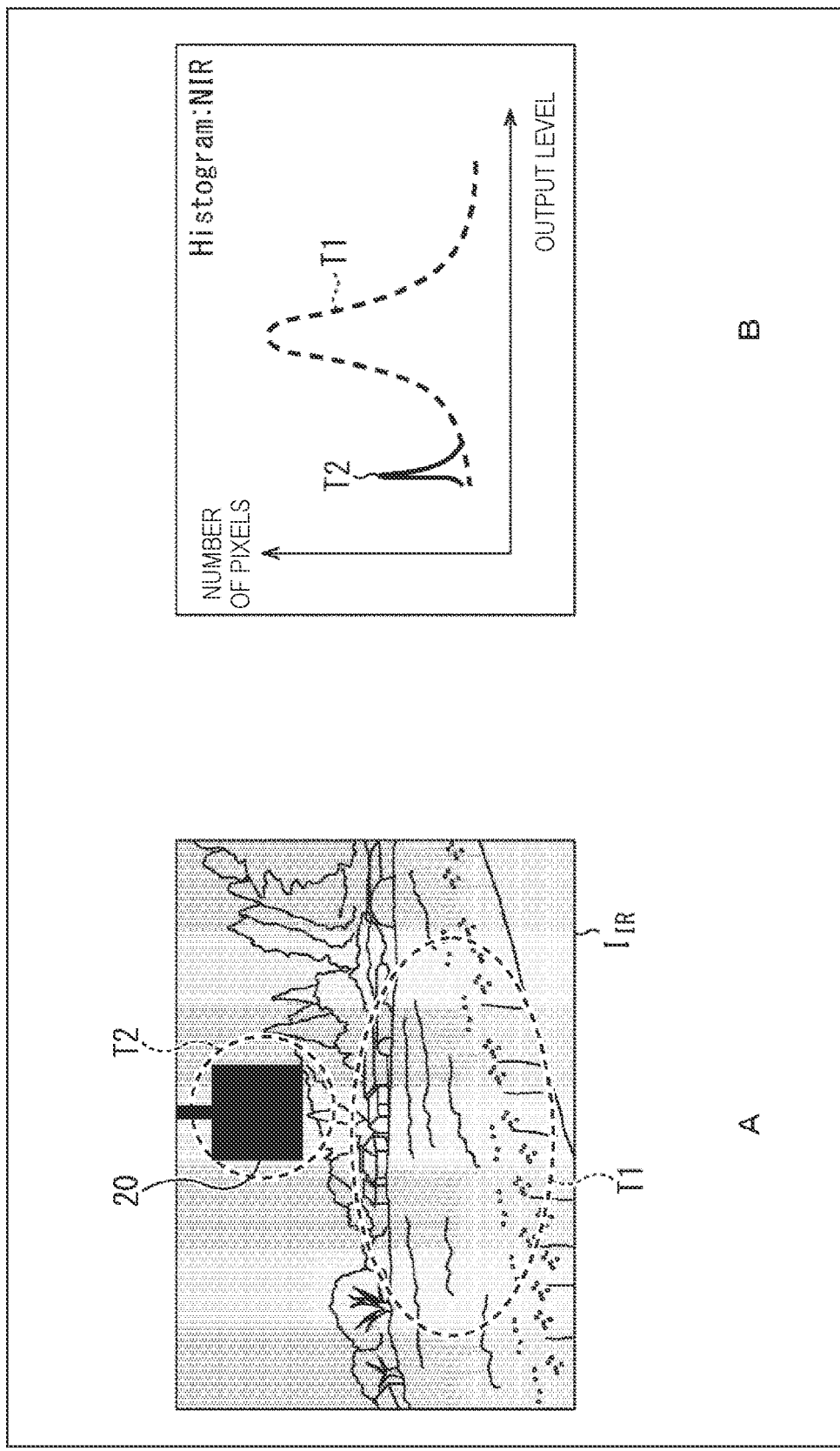
FIG. 2 is a diagram illustrating sensing results of a component in an infrared region (NIR).

FIG. 2 is a diagram illustrating a sensing result of a component in an infrared region (NIR) which is obtained by the sensing device 101-1.

In FIG. 2, A of FIG. 2 illustrates a sensing image obtained as a result of the sensing of an NIR component. In addition, B of FIG. 2 illustrates a histogram when the horizontal axis represents an output level of each pixel of the sensing image illustrated in A of FIG. 2, and the vertical axis represents the number of pixels.

The sensing image illustrated in A of FIG. 2 includes plants in a field as the inspection target 1 illustrated in FIG. 1 and the reference reflecting plate 20 installed in front of the sensing device 101-1. Here, in the sensing image illustrated in A of FIG. 2, when a region including the plants in the field is set to be a target region T1 and a region including the reference reflecting plate 20 is set to be a target region T2, histograms of the target regions T1 and T2 are illustrated in B of FIG. 2.

In B of FIG. 2, since the sensing device 101-1 adjusts an exposure for plants in a field having a large area when performing sensing, the target region T1 (the plants in the field) falls within a dynamic range, while the target region T2 (reference reflecting plate 20) is under-exposed to a lower output level (so-called blackening).

(Sensing Result of R Component)

Figure 3:
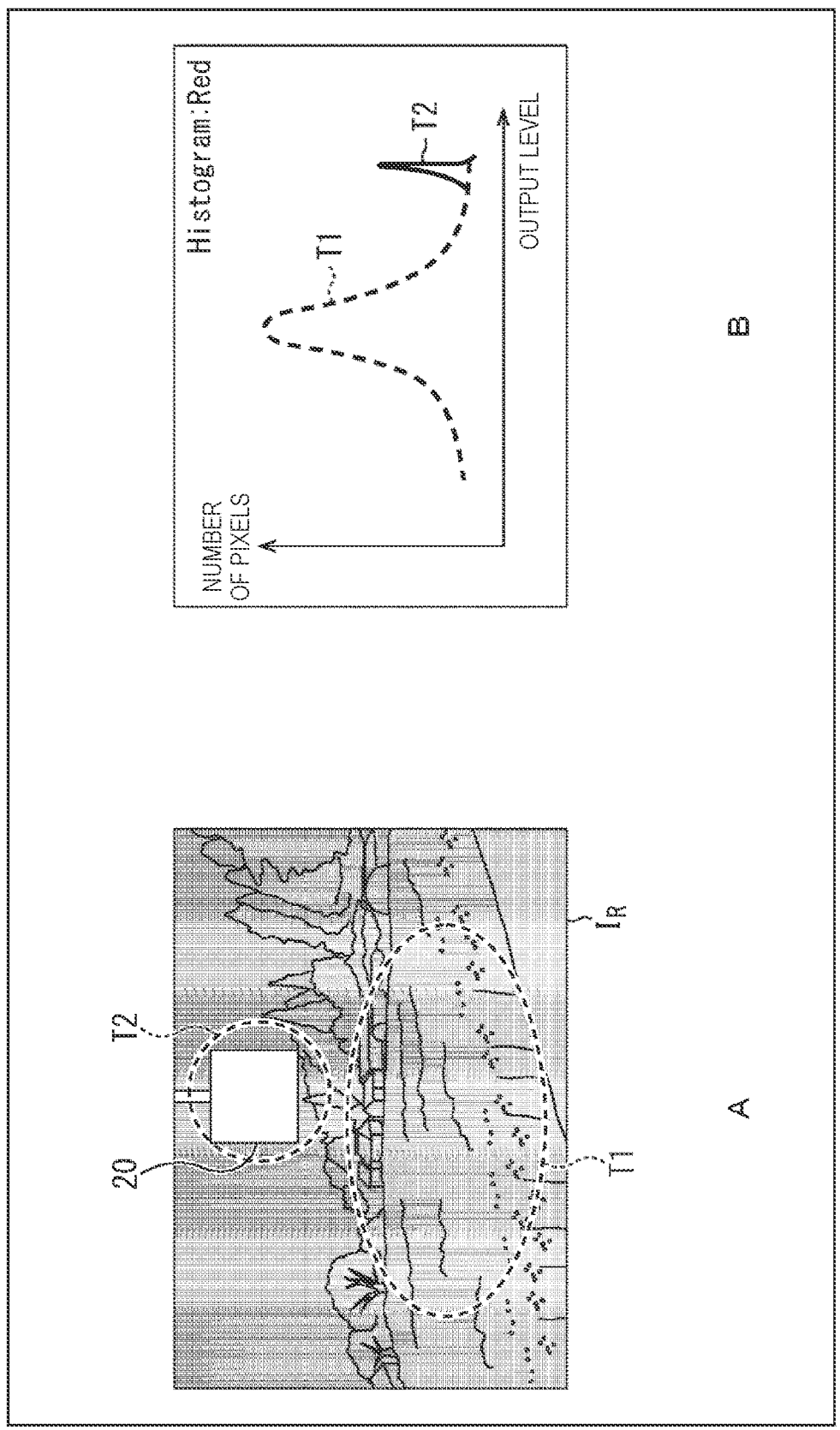
FIG. 3 is a diagram illustrating a sensing result of a red (R) component in a visible region.

FIG. 3 is a diagram illustrating a sensing result of a red (R) component in a visible region which is obtained by the sensing device 101-2.

In FIG. 3, A of FIG. 3 illustrates a sensing image $I_R$ obtained from a result of the sensing of an R component. In addition, B of FIG. 3 illustrates a histogram when the vertical axis represents an output level of each pixel of the sensing image $I_R$ illustrated in A of FIG. 3, and the vertical axis represents the number of pixels.

In a way similar to the The sensing image $I_n$ illustrated in A of FIG. 2, the sensing image $I_R$ illustrated in A of FIG. 3 includes plants in a field as the inspection target 1 and the reference reflecting plate 20 installed in front of the sensing device 101-2. Also in the sensing image $I_R$ illustrated in A of FIG. 3, when a region including the plants in the field is set to be a target region T1 and a region including the reference reflecting plate 20 is set to be a target region T2, histograms of the target regions T1 and T2 are illustrated in B of FIG. 3.

In B of FIG. 3, since the sensing device 101-2 adjusts exposure to plants in a field having a wide area when performing sensing, the target region T1 (the plants in the field) falls within a dynamic range, while the target region T2 (reference reflecting plate 20) is over-exposed to a higher output level (so-called white-out).

As described above with reference to FIGS. 2 and 3, when a difference between the reflectance of the inspection target 1 and the reflectance of the reference reflecting plate 20 is large, it becomes difficult to set an optimal exposure time for each measurement band, which results in a failure in the specification of a light source such as sunlight or significant deterioration of measurement accuracy. Thus, it is desirable to solve such a problem.

In the present technology, a plurality of reference reflecting plates 20 having a reflectance corresponding to the inspection target 1 are prepared for each wavelength band (measurement band) to be measured of the inspection target 1, and the inspection target 1 and the reference reflecting plate 20 having a reflectance corresponding to the inspection target 1 are simultaneously sensed, so that a difference between the reflectance of the inspection target 1 and the reflectance of the reference reflecting plate 20 is not high. Next, a configuration of the present technology will be described with reference to FIGS. 4 to 6.

(Measurement Performed by Movement Measurement Device of the Present Technology)

Figure 4:
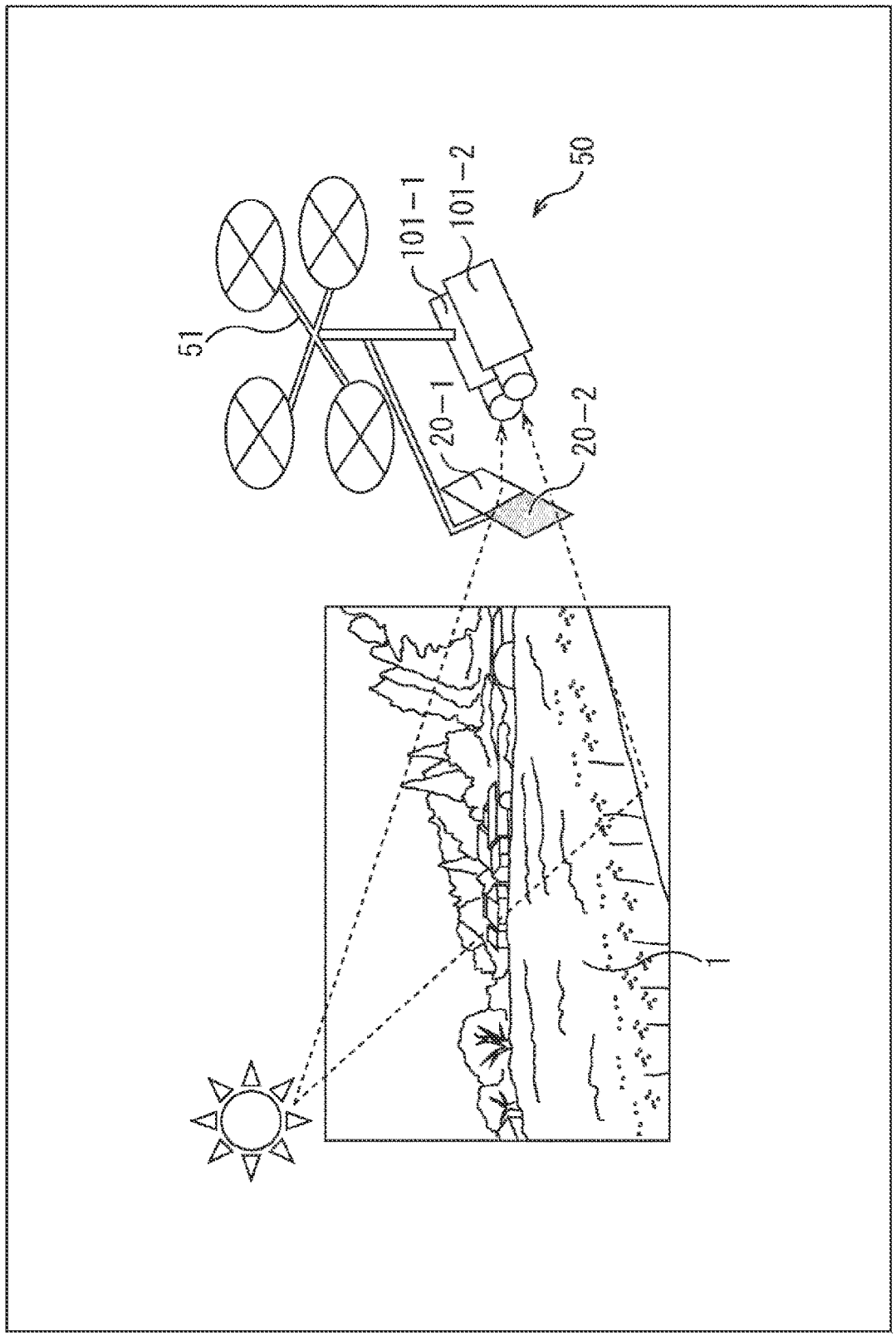
FIG. 4 is a diagram illustrating an example of measurement performed by the mobile measuring device to which the present technology is applied.

FIG. 4 is a diagram illustrating an example of measurement performed by the mobile measuring device to which the present technology is applied.

In FIG. 4, the mobile measuring device 50 includes a sensing device 101-1 and a sensing device 101-2. A reference reflecting plate 20-1 and a reference reflecting plate 20-2 having predetermined shapes are installed in front of the sensing device 101-1 and the sensing device 101-2.

Thereby, the inspection target 1 such as plants in a field, the reference reflecting plate 20-1, and the reference reflecting plate 20-2 are present within the same angle of view as objects (subjects) to be sensed by the sensing device 101-1 and the sensing device 101-2.

Here, the reference reflecting plate 20-1 and the reference reflecting plate 20-2 have a reflectance corresponding to the inspection target 1 for each wavelength band (measurement band) to be measured of the inspection target 1. For example, in a case where the inspection target 1 is plants in a field, the reference reflecting plate 20-1 has a reflectance matching a reflectance in an infrared region (NIR) in a measurement band of the plants. In addition, for example, the reference reflecting plate 20-2 has a reflectance matching a reflectance in red (R) of a visible region in the measurement band of the plants.

(Sensing Result of NIR Component of the Present Technology)

Figure 5:
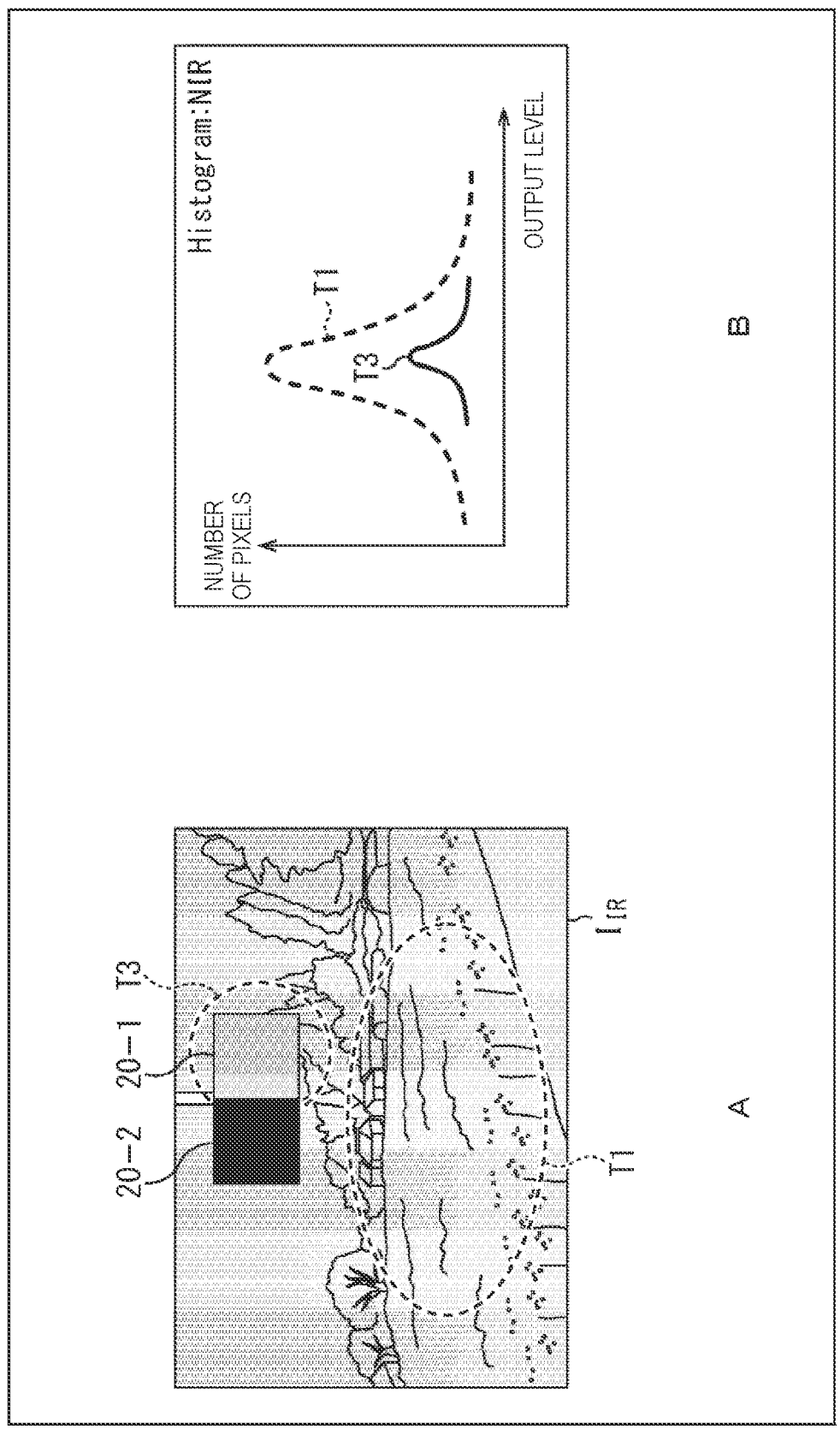
FIG. 5 is a diagram illustrating a sensing result of a component in an infrared region (NIR) in a case where the present technology is applied.

FIG. 5 is a diagram illustrating a sensing result of a component in an infrared region (NIR) which is obtained by the sensing device 101-1 in a case where the present technology is applied.

In FIG. 5, A of FIG. 5 illustrates a sensing image $I_{IR}$ obtained from a result of the sensing of a NIR component. In addition, B of FIG. 5 illustrates a histogram when the horizontal axis represents an output level of each pixel of the sensing image lift illustrated in A of FIG. 5, and the vertical axis represents the number of pixels.

The sensing image $I_{IR}$ illustrated in A of FIG. 5 includes plants in a field as the inspection target 1 illustrated in FIG. 4 and the reference reflecting plate 20-1 and the reference reflecting plate 20-2 installed in front of the sensing device 101-1. Here, in the sensing image $I_{IR}$ illustrated in A of FIG. 5, when a region including the plants in the field is set to be a target region T1 and a region including the reference reflecting plate 20-1 among the plurality of reference reflecting plates 20 is set to be a target region T3, histograms of the target regions T1 and T3 are illustrated in B of FIG. 5.

In B of FIG. 5, the sensing device 101-1 adjusts an exposure for plants in a field having a wide area when performing sensing, but the reference reflecting plate 20-1 has a reflectance matching a reflectance in an infrared region (NIR) in a measurement band of the inspection target 1, and thus the target region T3 (reference reflecting plate 20-1) also falls within a dynamic range together with the target region T1 (the plants in the field).

Note that, in the sensing image in A of FIG. 5, among the plurality of reference reflecting plates 20, the reference reflecting plate 20-2 does not have a reflectance matching a reflectance in an infrared region (NIR) (has a reflectance matching a reflectance of red (R) in the visible region), and thus the reference reflecting plate 20-2 is under-exposed to a lower output level (so-called blackening).

(Sensing Result of R Component of the Present Technology)

Figure 6:
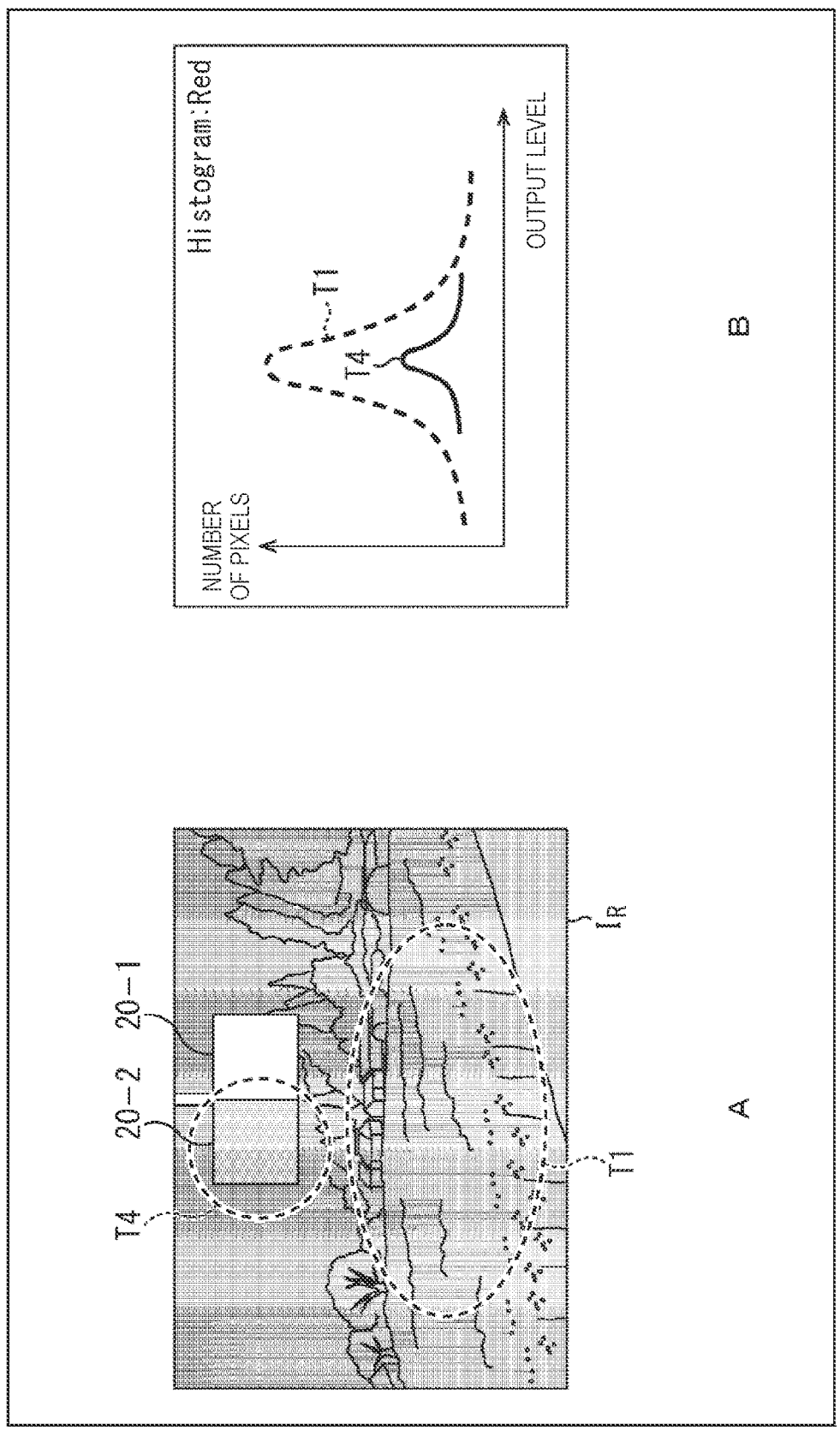
FIG. 6 is a diagram illustrating a sensing result of a red (R) component in a visible region in a case where the present technology is applied.

FIG. 6 is a diagram illustrating a sensing result of a red (R) component in a visible region which is obtained by the sensing device 101-2 in a case where the present technology is applied.

In FIG. 6, A of FIG. 6 illustrates a sensing image $I_R$ obtained from a result of the sensing of an R component. In addition, B of FIG. 6 illustrates a histogram when the vertical axis represents an output level of each pixel of the sensing image $I_R$ illustrated in A of FIG. 6, and the vertical axis represents the number of pixels.

In a way similar to the sensing image $I_{IR}$ illustrated in A of FIG. 5, the sensing image $I_R$ illustrated in A of FIG. 6 includes plants in a field as the inspection target 1 illustrated in FIG. 4 and the reference reflecting plate 20-1 and the reference reflecting plate 20-2 installed in front of the sensing device 101-2. Also in the sensing image $I_R$ illustrated in A of FIG. 6, when a region including the plants in the field is set to be a target region T1 and a region including the reference reflecting plate 20-2 is set to be a target region T4, histograms of the target regions T1 and T4 are illustrated in B of FIG. 6.

In B of FIG. 6, the sensing device 101-2 adjusts an exposure for plants in a field having a wide area when performing sensing, but the reference reflecting plate 20-1 has a reflectance matching a reflectance of red (R) in a visible region in a measurement band of the inspection target 1, and thus the target region T4 (reference reflecting plate 20-2) also falls within a dynamic range together with the target region T1 (the plants in the field).

Note that, in the sensing image $I_R$ in A of FIG. 6, among the plurality of reference reflecting plates 20, the reference reflecting plate 20-1 does not have a reflectance matching a reflectance in red (R) in the visible region (has a reflectance matching a reflectance in an infrared region (NIR)), and thus the reference reflecting plate 20-1 is over-exposed to a higher output level (so-called white-out).

As described above with reference to FIGS. 4 to 6, in the present technology, a plurality of reference reflecting plates 20 having a reflectance corresponding to the inspection target 1 are prepared for each wavelength band (measurement band) to be measured of the inspection target 1, and a region including the inspection target 1 and the reference reflecting plate 20 having a reflectance corresponding to the inspection target 1 are simultaneously sensed for each measurement band. Thereby, an increase in a difference between the reflectance of the inspection target 1 and the reflectance of the reference reflecting plate 20 is curbed, and an optimal exposure time is set for each measurement band. As a result, it is possible to reliably perform the specification of a light source such as sunlight and to perform measurement with higher accuracy.

Note that, in FIG. 4, the mobile measuring device 50, in addition to radio control, for example, may be made to perform autonomous flight by memorizing beforehand a flight route as coordinate data and using position information, such as GPS (Global Positioning System). Moreover, although, in FIG. 4, the description has been given for a case where the mobile measuring device 50 is a rotary wing aircraft with the rotary wings 51, the mobile measuring device 50 may be a fixed-wing aircraft.

2. Configuration of System (Configuration of Index Measurement System)

Figure 7:
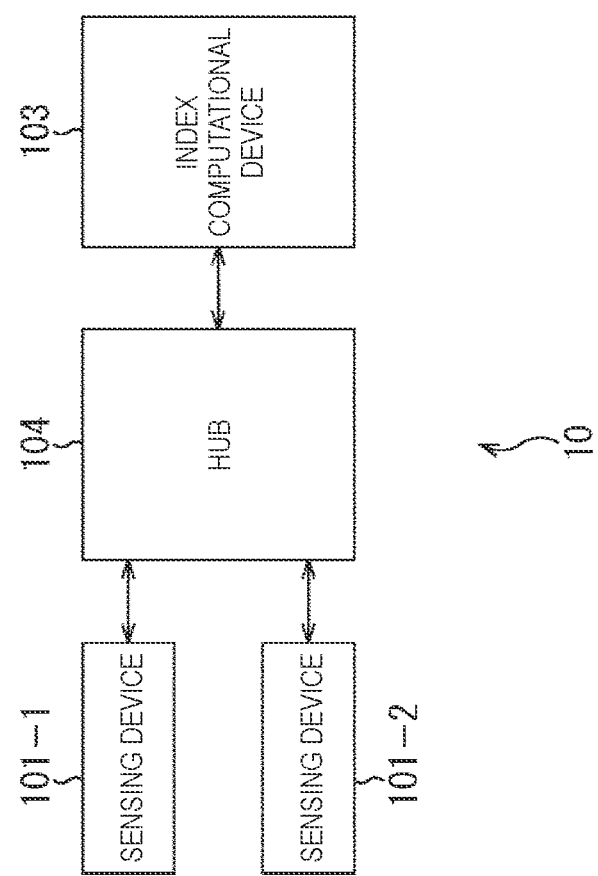
FIG. 7 is a diagram illustrating a configuration of an embodiment of an index measuring system to which the present technology is applied.

FIG. 7 is a diagram illustrating a configuration of an embodiment of an index measuring system to which the present technology is applied.

An index measuring system 10 is a system (sensing system) for sensing a region including the inspection target 1 such as plants in a field and calculating an inspection index such as an NDVI value on the basis of a result of the sensing.

In FIG. 7, the index computational system 10 includes the sensing device 101-1, the sensing device 101-2, and an index computational device 103. The sensing device 101-1, the sensing device 101-2, and the index computational device 103 are connected to each other through a hub 104.

The sensing device 101-1 senses the region including the inspection target 1 and outputs data obtained by the sensing. Here, the sensing means measurement of the region including the inspection target 1. In addition, the sensing includes imaging of the region including the inspection target 1.

The sensing device 101-1 senses the region including the inspection target 1 and outputs the measurement result to the index computational device 103 through the hub 104 as index measurement data. Here, the index measurement data is data for measuring an inspection index such as an NDVI value.

Similarly to the sensing device 101-1, the sensing device 101-2 senses the region including the inspection target 1 and outputs the measurement result to the index computational device 103 through the hub 104 as index measurement data.

As illustrated in FIG. 4, the sensing device 101-1 and the sensing device 101-2 can be configured as the mobile measuring device 50. In addition, the plurality of reference reflecting plates 20 such as the reference reflecting plate 20-1 and the reference reflecting plate 20-2 are prepared in front of the sensing device 101-1 and the sensing device 101-2 (within an angle of view).

Note that detailed configurations of the sensing device 101-1 and the sensing device 101-2 will be described later with reference to FIG. 8. In addition, hereinafter, a description will be given by simply collectively referring to the sensing device 101-1 and the sensing device 101-2 as a sensing device 101 unless it is particularly necessary to distinguish between the sensing devices.

The index computational device 103 is a device having a computation function performed by a circuit such as a Central Processing Unit (CPU) or a Field Programmable Gate Array (FPGA). For example, the index computational device 103 is configured as a personal computer, a dedicated terminal device, or the like. Index measurement data from the sensing device 101-1 and the sensing device 101-2 is input to the index computational device 103 through the hub 104.

The index computational device 103 calculates an inspection index of the inspection target 1 on the basis of the index measurement data. Here, it is possible to calculate an NDVI value by computationally calculating Expression (1) described above on the basis of, for example, an NIR signal and an R signal obtained from the index measurement data.

In addition, the index computational device 103 can remotely control the sensing device 101-1 and the sensing device 101-2 through the hub 104. For example, the index computational device 103 may control exposure during measurement performed by the sensing device 101-1 and the sensing device 101-2.

Note that a detailed configuration of the index computational device 103 will be described later with reference to FIG. 9.

The index measuring system 10 is configured as described above.

(Configuration of Sensing Device)

Figure 8:
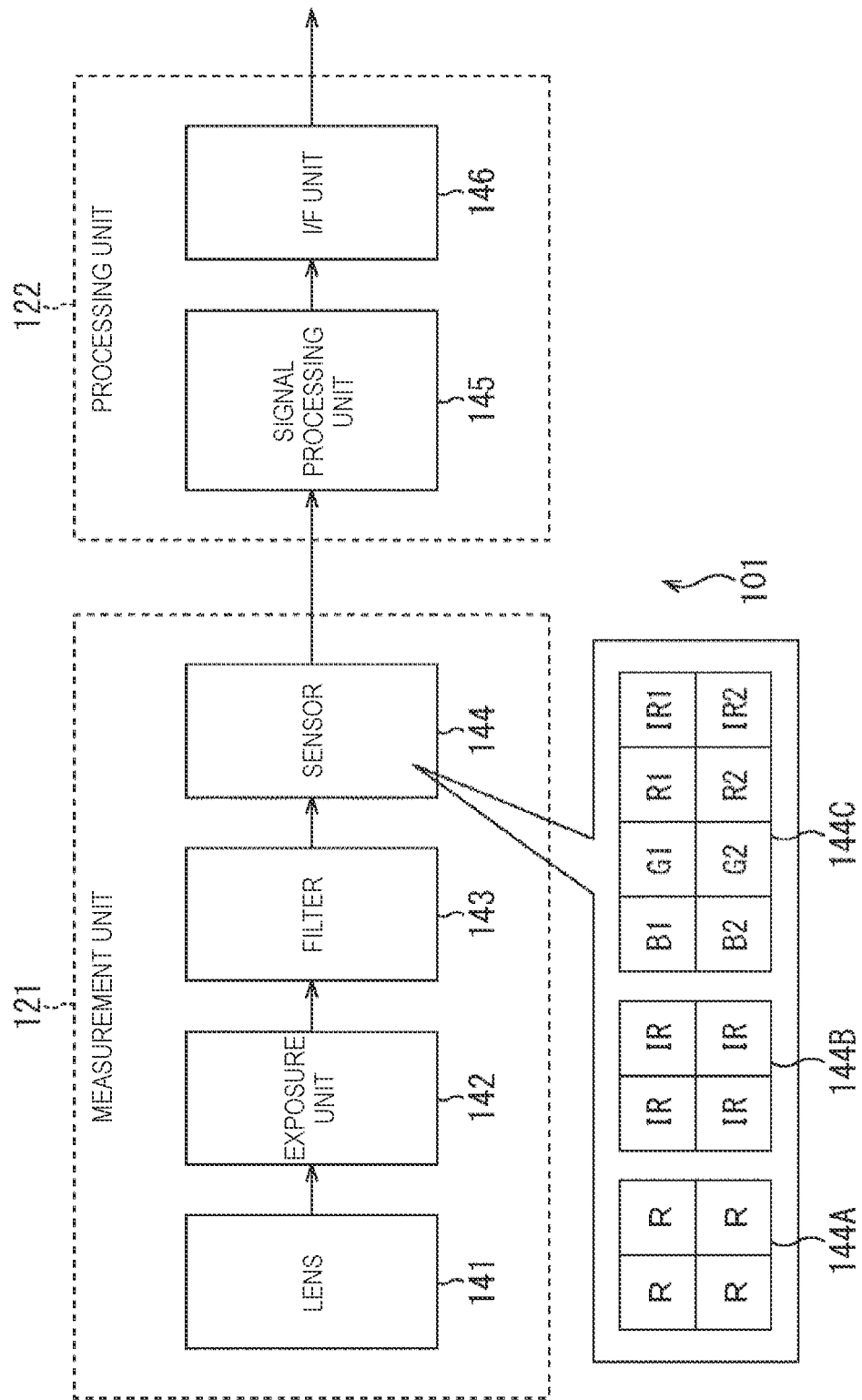
FIG. 8 is a diagram illustrating a configuration example of a sensing device.

FIG. 8 is a diagram illustrating a configuration example of the sensing device 101 of FIG. 7.

In FIG. 8, the sensing device 101 includes a measurement unit 121 including a lens 141, an exposure unit 142, a filter 143, and a sensor 144, and a processing unit 122 including a signal processing unit 145 and an I/F unit 146.

In the sensing device 101, light (reflected light) from an object (subject) such as the inspection target 1 or the reference reflecting plate 20 is incident on the sensor 144 through the lens 141 and the filter 143.

The exposure unit 142 performs exposure control by adjusting an aperture amount of an optical system such as the lens 141 or an iris (diaphragm), and the like so that sensing is performed in the sensor 144 in a state where a signal charge is within a dynamic range without being saturated. However, the exposure control can be performed by remote control from the index computational device 103.

The filter 143 is an optical filter based on an inspection index of a measurement target. The filter 143 makes light having a predetermined wavelength band among the light incident through the lens 141 pass through the sensor 144.

The sensor 144 is an image sensor constituted by a sensing element in which a plurality of pixels are two-dimensionally arranged in repetitive patterns on the surface of the sensor. The sensor 144 detects the light having passed through the filter 143 using the sensing element, and outputs a measurement signal (measurement data) based on the amount of light to the signal processing unit 145.

Here, for example, in a case where an NDVI value is calculated as an inspection index, an R signal is required, and thus a combination of an R filter and an NIR cut filter is provided as the filter 143. In this case, in the sensing element of the sensor 144, all of the pixels are two-dimensionally arranged as R pixels corresponding to a red (R) component, for example, as indicated by an arrangement pattern 144A of FIG. 8.

That is, in the sensing device 101-2 (FIG. 4) described above, a combination of an R filter and an IR cut filter is provided as the filter 143.

However, an arrangement pattern of a plurality of pixels which are two-dimensionally arranged in the sensing element of the sensor 144 is not limited to an array of pixels indicated by the arrangement pattern 144A, and other arrangement patterns may be adopted as long as an R signal is taken. Here, the plurality of pixels can be two-dimensionally arranged, for example, in a Bayer array. A Bayer array refers to an arrangement pattern in which G pixels of green (G) are arranged in a checkerboard form, and R pixels of red (R) and B pixels of blue (B) are alternately disposed for every row in the remaining portions. In particular, not only an R filter and an IR filter but also a filter in a visible region such as green (G) or blue (B) may be provided, and thus it is possible to capture not only an inspection index but also an image to be presented to a user and to simultaneously present the inspection index and the image.

In addition, for example, in a case where an NDVI value is calculated as an inspection index, an NIR signal is required, and thus an NIR filter is provided as the filter 143. In this case, in the sensing element of the sensor 144, all of the pixels are two-dimensionally arranged as IR pixels corresponding to an infrared region (NIR), for example, as indicated by an arrangement pattern 144B of FIG. 8.

That is, in the sensing device 101-1 (FIG. 4) described above, an NIR filter is provided as the filter 143.

Further, in the arrangement pattern 144A of FIG. 8, a configuration in which the NIR cut filter is provided has been described, but a configuration in which an NIR cut filter is not provided may be adopted. In this case, in the sensing element of the sensor 144, IR pixels corresponding to an infrared region (NIR) can be disposed other than R, G, and B pixels corresponding to an RGB filter transmitting wavelengths of visible light of red (R), green (G), and blue (B), for example, as indicated by an arrangement pattern 144C of FIG. 8.

In the arrangement pattern 144C in FIG. 8, for example, four pixels are arranged in the transvers direction and two pixels are arranged in the longitudinal direction so that 4×2 pixels (two R pixels (R1, R2), two G pixels (G1, G2), two B pixels (B1, B2), two IR pixels (IR1, IR2)) are made one set. Then, such eight pixels are made one set, and a plurality of pixels that constitutes n (n is an integer of one or more) sets is arranged repeatedly on the surface of the sensor of the sensing element. In this connection, the number of pixels per one set is not limited to eight pixels, and, for example, other forms such as a constitution in which four pixels including one R pixel, one G pixel, one B pixel, and one IR pixel, are made one set, may be adopted.

Here, in a case where an NDVI value is calculated as an inspection index, an R signal and an NIR signal are obtained by one sensor 144 when the sensor 144 including R pixels and IR pixels can be used. Thus, as illustrated in FIGS. 4 and 7, it is not necessary to provide two sensing devices 101-1 and 101-2. That is, in this case, it is possible to play a role of two sensing devices 101-1 and 101-2 by (the sensor 144 of) one sensing device 101, for example, by independently controlling a gain for each pixel such as an R pixel or an IR pixel or simultaneously outputting different images with a plurality of streams.

Note that, in the arrangement pattern 144C of FIG. 8, a case where four types of pixels of an R pixel, a G pixel, a B pixel, and an IR pixel are arranged has been illustrated, but at least an R pixel and an IR pixel may be included in an arrangement pattern in a case where an NDVI value is calculated as an inspection index.

The signal processing unit 145 performs predetermined signal processing such as a process of rearranging pieces of data on measurement data output from the sensor 144, and outputs the processed data to the I/F unit 146.

Note that, although a description will be given in the present embodiment on the assumption that an inspection index such as an NDVI value is calculated by the index computational device 103 provided at the rear stage, the signal processing unit 145 may be constituted by a circuit such as a CPU or an FPGA to calculate an inspection index such as an NDVI value on the basis of measurement data.

The I/F unit 146 is constituted by an external output interface circuit or the like, and outputs measurement data supplied from the signal processing unit 145 to the index computational device 103 through the hub 104 as index measurement data.

The sensing device 101 is configured as described above.

Note that, in the description of the present embodiment, a distinction will be made by adding "-1" and "-2" as signs in a case where a plurality of sensing devices 101 are provided in the index computational system 10. In addition, a distinction will be made in the same manner with respect to the filter 143, the sensor 144, and the like within the sensing device 101.

(Configuration of Index Computational Device)

Figure 9:
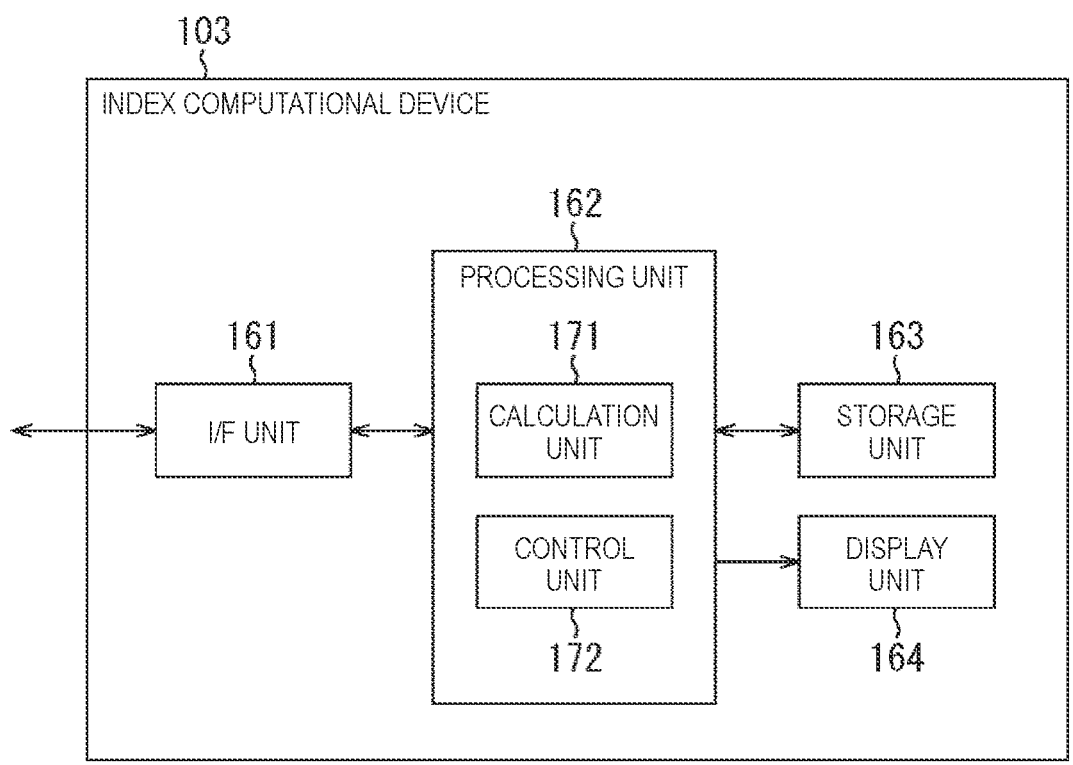
FIG. 9 is a diagram illustrating a configuration example of an index computational device.

FIG. 9 is a diagram illustrating a configuration example of the index computational device 103 of FIG. 7.

In FIG. 9, the index computational device 103 includes an I/F unit 161, a processing unit 162, a storage unit 163, and a display unit 164.

The I/F unit 161 is constituted by an external input interface circuit or the like, and supplies index measurement data input from the sensing device 101-1 and the sensing device 101-2 to the processing unit 162.

The processing unit 162 is constituted by a circuit such as a CPU or an FPGA. The processing unit 162 includes a calculation unit 171 and a control unit 172.

The calculation unit 171 performs predetermined signal processing on the basis of index measurement data supplied from the I/F unit 161 to calculate an inspection index of the inspection target 1. Details of the signal processing will be described later. Here, it is possible to calculate an NDVI value by computationally calculating Expression (1) described above, for example, on the basis of an NIR signal and an R signal obtained from the index measurement data.

The control unit 172 controls the operation of each unit of the index computational device 103. In addition, the control unit 172 remotely controls the sensing device 101-1 and the sensing device 101-2 through the hub 104. For example, the control unit 172 controls exposure during measurement performed by the sensing device 101-1 and the sensing device 101-2.

The storage unit 163 is constituted by, for example, a semiconductor memory, a hard disk, or the like. The storage unit 163 stores data (for example, numerical data, image data, and the like) regarding the inspection index calculated by the calculation unit 171 under the control of the control unit 172.

The display unit 164 is constituted by a display such as a Liquid Crystal Display (LCD) or an Organic Electroluminescence Display (OELD). The display unit 164 displays the data (for example, numerical data, image data, and the like) regarding the inspection index calculated by the calculation unit 171 under the control of the control unit 172. In addition, the display unit 164 can display various pieces of data stored in the storage unit 163 under the control of the control unit 172.

Note that, although a description has been given on the assumption that the storage unit 163 and the display unit 164 are provided inside the index computational device 103 in FIG. 9, the storage unit 163 and the display unit 164 may be provided outside the index computational device 103 as a storage device and a display device. In this case, the control unit 172 can cause an external storage device or an external display device to store or display various pieces of data such as numerical data and image data obtained by signal processing.

The index computational device 103 is configured as described above.

(Other Configurations of Index Computational System)

Incidentally, in the index computational system 10 illustrated in FIG. 7, the index computational device 103 such as a personal computer calculates an inspection index (for example, an NDVI value) of the inspection target 1 in a local environment through the hub 104, but the inspection index of the inspection target 1 may be calculated in a cloud environment through a network.

Figure 10:
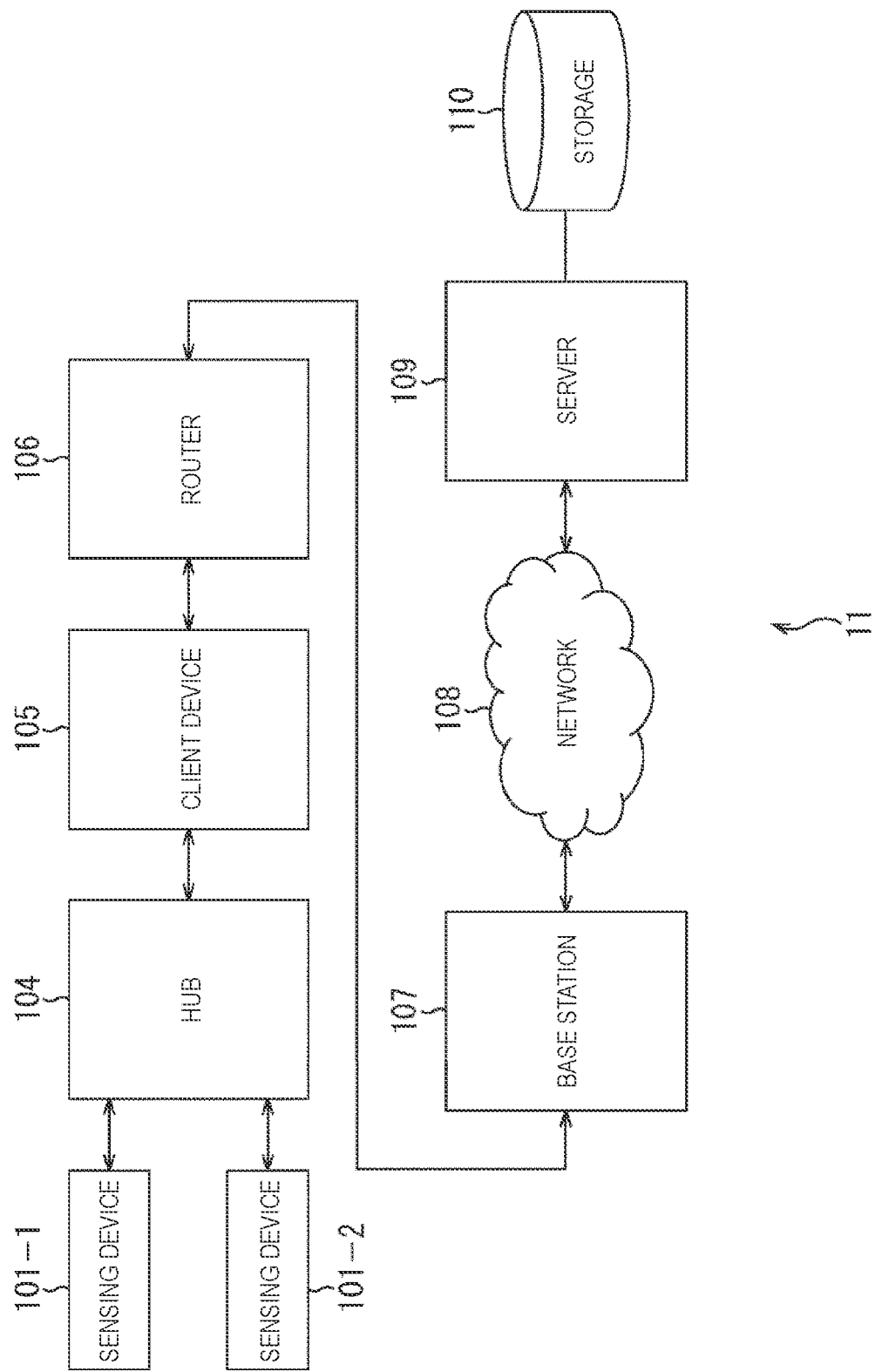
FIG. 10 is a diagram illustrating another configuration of an index computational system.

FIG. 10 illustrates a configuration example of an index computational system 11 corresponding to a cloud environment as another configuration example of the index computational system.

In the effective index computational system 11 of FIG. 10, the sensing device 101-1 and the sensing device 101-2 output index measurement data obtained as a result of sensing to a client device 105 through the hub 104, similar to the sensing device 101-1 and the sensing device 101-2 of FIG. 7. However, the sensing device 101-1 and the sensing device 101-2 can be built into the mobile measuring device 50, as illustrated in FIG. 4.

The client device 105 is constituted by a personal computer or the like, and outputs index measurement data input from the sensing device 101-1 and the sensing device 101-2 to a router 106 through the hub 104. That is, the client device 105 corresponds to the index computational device 103 of FIG. 7, but does not perform signal processing for calculating an inspection index of the inspection target 1.

The router 106 is, for example, a router for mobile, and can be connected to a network 108 such as the Internet through a base station 107. The router 106 transmits index measurement data to be input from the client device 105 to a server 109 through the network 108.

The server 109 receives the index measurement data transmitted from the client device 105 through the network 108. Here, the server 109 has at least the same functions as those of the processing unit 162 among the functions of the index computational device 103 illustrated in FIG. 9.

That is, in the server 109, the calculation unit 171 of the processing unit 162 calculates an inspection index (for example, an NDVI value) of the inspection target 1 on the basis of the index measurement data received from the client device 105. Data (for example, numerical data or image data) regarding the inspection index of the inspection target 1 calculated by the server 109 can be stored in a storage 110.

Further, in a case where the server 109 includes the display unit 164 or the server 109 and display unit 164 can communicate with each other, the data regarding the inspection index of the inspection target 1 can be displayed on the display unit 164. In addition, the server 109 may read out the data stored in the storage 110 and may display the read-out data on the display unit 164.

The index computational system 11 is configured as described above.

3. Measurement Example of Sensing Device

Next, an example of measurement performed by the sensing device 101-1 and the sensing device 101-2 will be described with reference to FIGS. 11 to 15.

In the following description, a configuration in which a single reference reflecting plate 20 is used will be described for comparison with the configuration of the present technology in which a plurality of reference reflecting plates 20 are used. That is, the configuration in which a single reference reflecting plate 20 is used corresponds to the above-described configuration during measurement of FIG. 1, and the configuration in which the plurality of reference reflecting plates 20 are used corresponds to the above-described configuration (the configuration of the present technology) during measurement of FIG. 4.

Note that, in the following description, a description will be given on the assumption that the sensing device 101-1 includes a lens 141-1, an exposure unit 142-1, a filter 143-1 (NIR filter 143-1), a sensor 144-1, a signal processing unit 145-1, and an I/F unit 146-1. In addition, a description will be given on the assumption that the sensing device 101-2 includes a lens 141-2, an exposure unit 142-2, a filter 143-2 (an R filter 143-2 and an NIR cut filter), a sensor 144-2, a signal processing unit 145-2, and an I/F unit 146-2.

(Characteristics of Filter and Sensor)

Figure 11:
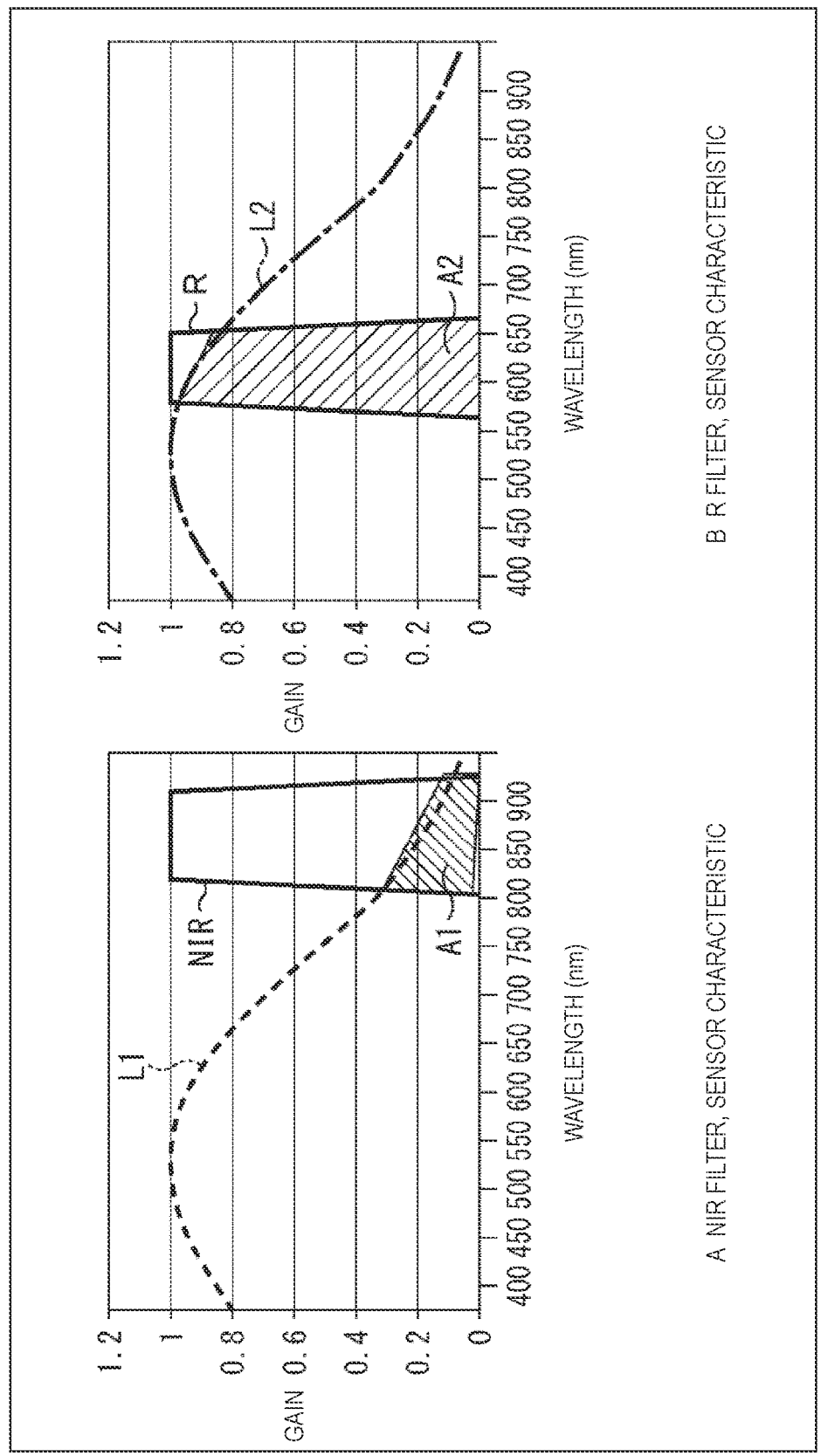
FIG. 11 is a diagram illustrating an example of characteristics of a filter and a sensor.

FIG. 11 is a diagram illustrating an example of characteristics of a filter and a sensor.

A of FIG. 11 illustrates characteristics of the filter 143-1 and the sensor 144-1 in the sensing device 101-1. That is, A of FIG. 11 illustrates characteristics of the NIR filter 143-1 and the sensor 144-1 when the horizontal axis represents a wavelength (nm) and the vertical axis represents a gain.

As illustrated in A of FIG. 11, the NIR filter 143-1 has a characteristic of transmitting light in an infrared region (NIR) such as a range of 800 nm to 940 nm. Therefore, in A of FIG. 11, in a case where the sensor 144-1 has a spectral sensitivity characteristic as indicated by a line L1, a signal in a band corresponding to a region A1 which is a shaded portion is integrated as an NIR signal and output.

B of FIG. 11 illustrates characteristics of the filter 143-2 and the sensor 144-2 in the sensing device 101-2. That is, B of FIG. 11 illustrates characteristics of the R filter 143-2 and the sensor 144-2 when the horizontal axis represents a wavelength (nm) and the vertical axis represents a gain.

As illustrated in B of FIG. 11, the R filter 143-2 has a characteristic of transmitting light of red (R) in a visible region such as a range of 580 nm to 680 nm. Therefore, in B of FIG. 11, in a case where the sensor 144-2 has a spectral sensitivity characteristic as indicated by a line L2, a signal in a band corresponding to a region A2 which is a shaded portion is integrated as an R signal and output.

(1) Configuration of Single Reference Reflecting Plate

Here, first, a configuration in which a single reference reflecting plate 20 is used corresponding to the above-described configuration during measurement of FIG. 1 will be described for comparison with the configuration of the present technology.

(Characteristics of Reference Reflecting Plate and Inspection Target)

Figure 12:
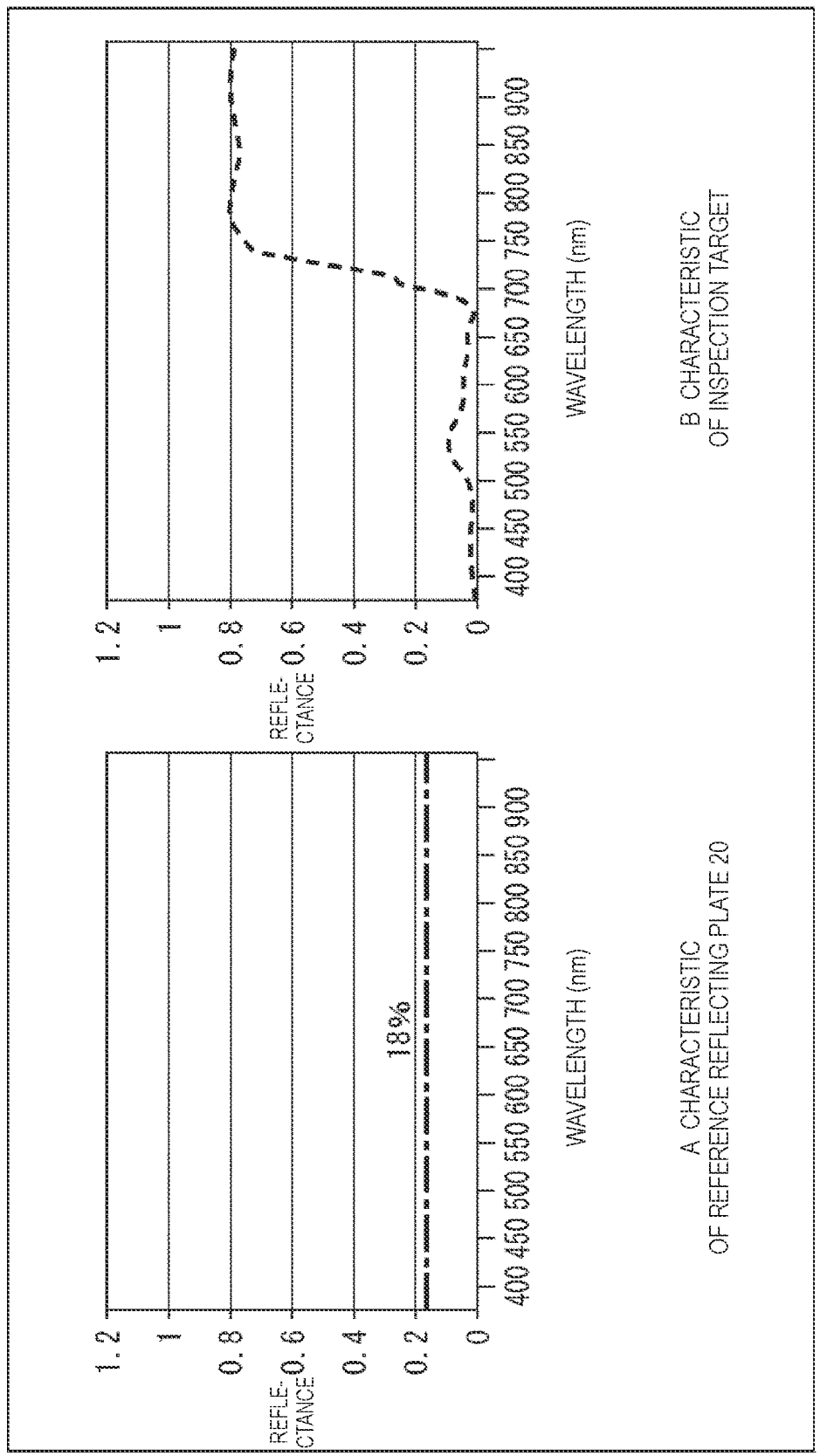
FIG. 12 is a diagram illustrating an example of characteristics of a reference reflecting plate and an inspection target in a case where a configuration of a single reference reflecting plate is adopted.

FIG. 12 is a diagram illustrating an example of characteristics of the reference reflecting plate 20 and the inspection target 1 in a case where a configuration of a single reference reflecting plate is adopted.

A of FIG. 12 illustrates an example of a characteristic of the reference reflecting plate 20 (FIG. 1) when the horizontal axis represents a wavelength (nm) and the vertical axis represents a reflectance. For example, a generally used gray reflecting plate can be used as the reference reflecting plate 20. As illustrated in A of FIG. 12, the reflectance of the reference reflecting plate 20 is approximately 0.18 which is constant, and a spectral reflectance characteristic is flat.

B of FIG. 12 illustrates an example of a characteristic of the inspection target 1 (FIG. 1) when the horizontal axis represents a wavelength (nm) and the vertical axis represents a reflectance. As illustrated in B of FIG. 12, the reflectance of the inspection target 1 has a value close to 0 up to around 700 nm, but increases in the vicinity of 700 nm and has a value close to approximately 0.8 (80%) in a range exceeding 700 nm. That is, for example, in a case where plants such as plants in a field are the inspection target 1, the reflectance decreases in a visible region and increases in an infrared region.

(Flow of Signal Processing During Measurement of Sensing Device)

Figure 13:
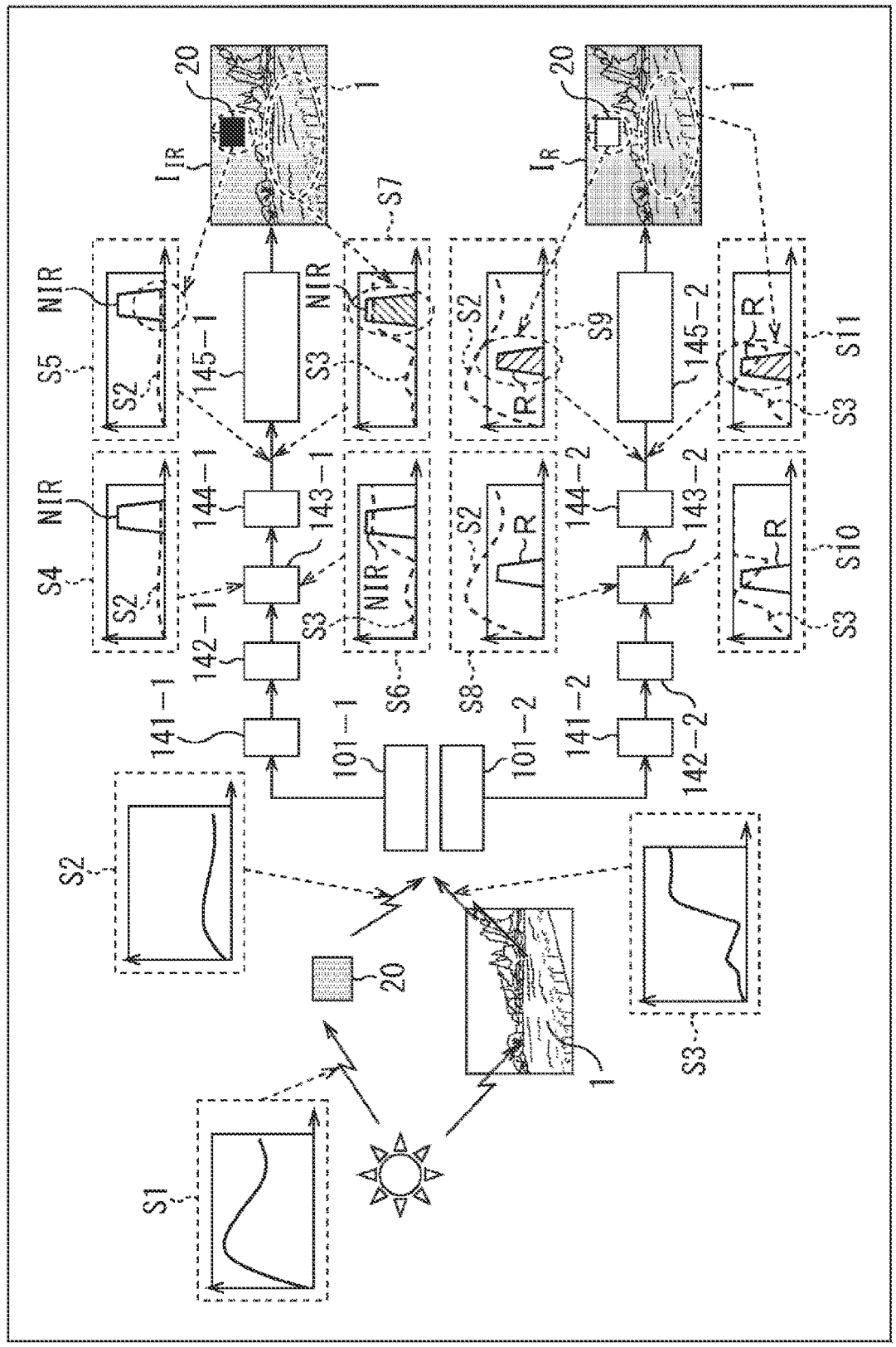
FIG. 13 is a diagram illustrating a flow of signal processing during measurement of sensing devices in a case where a configuration of a single reference reflecting plate is adopted.

FIG. 13 is a diagram illustrating a flow of signal processing during measurement of the sensing device 101-1 and the sensing device 101-2 in a case where a configuration of a single reference reflecting plate is adopted.

Note that, in FIG. 13, an upper sequence in the drawing shows a flow of a signal processed by the sensing device 101-1 having the NIR filter 143-1 attached thereto, and a lower sequence in the drawing shows a flow of a signal processed by the sensing device 101-2 having the R filter 143-2 attached thereto, with respect to light reflected from the reference reflecting plate 20 or the inspection target 1.

In FIG. 13, sunlight (environment light) is reflected by the reference reflecting plate 20, and the reflected light is incident on the sensing device 101-1 and the sensing device 101-2. A spectral characteristic of the sunlight is indicated by a spectral characteristic S1. In addition, a spectral characteristic of the light reflected from the reference reflecting plate 20 is indicated by a spectral characteristic S2. That is, the reference reflecting plate 20 has the flat spectral characteristic illustrated in A of FIG. 12, and thus a spectral characteristic of the light reflected from the reference reflecting plate 20 is as indicated by the spectral characteristic S2.

In addition, sunlight is reflected by the inspection target 1 such as plants in a field, and the reflected light is incident on the sensing device 101-1 and the sensing device 101-2. A spectral characteristic of the light reflected from the inspection target 1 is indicated by a spectral characteristic S3. That is, the inspection target 1 has a reflection characteristic having a shape illustrated in B of FIG. 12, and thus a spectral characteristic of the light reflected from the inspection target 1 is as indicated by the spectral characteristic S3.

In the sensing device 101-1, light reflected by the reference reflecting plate 20 and the inspection target 1 is incident on the lens 141-1 and passes through the NIR filter 143-1, so that an image is formed on the sensor surface of the sensor 144-1. However, in a case where plants such as plants in a field are the inspection target 1, a reflectance in an infrared region increases, and thus a short exposure time is set in accordance with the amount of light of an NIR component by the exposure unit 142-1 in the sensing device 101-1 transmitting the light of the NIR component by the NIR filter 143-1.

In the sensing device 101-1, a characteristic of the NIR filter 143-1 is indicated by a spectral characteristic S4 and a spectral characteristic S6. In the spectral characteristics S4 and S6, the characteristic of the NIR filter 143-1 corresponds to a transmission characteristic of the NIR filter illustrated in A of FIG. 11. Note that the characteristic (spectral characteristic S2) of the reference reflecting plate 20 is superimposed on the spectral characteristic S4 with respect to the characteristic of the NIR filter 143-1. In addition, the characteristic (spectral characteristic S3) of the inspection target 1 is superimposed on the spectral characteristic S6 with respect to the characteristic of the NIR filter 143-1.

As indicated by the spectral characteristic S5 on which the characteristic (spectral characteristic S2) of the light reflected from the reference reflecting plate 20 is superimposed with respect to the characteristic of the NIR filter 143-1, the sensor 144-1 outputs light received by the sensor surface and reflected from the reference reflecting plate 20 as the level of an NIR component in a region (the target region T2 in FIG. 2) including the reference reflecting plate 20.

In addition, as indicated by a spectral characteristic S7 on which the characteristic (spectral characteristic S3) of the light reflected from the inspection target 1 is superimposed with respect to the characteristic of the NIR filter 143-1, the sensor 144-1 outputs light received by the sensor surface and reflected from the inspection target 1 as the level of an NIR component in a region (the target region T1 in FIG. 2) including the inspection target 1.

That is, a signal corresponding to the level of the NIR components is NIR data (NIR signal) obtained by sensing the regions including the reference reflecting plate 20 and the inspection target 1 by the sensing device 101-1. The signal processing unit 145-1 performs a process of rearranging data from the sensor 144-1, and the like and outputs data obtained as a result of the process through the I/F unit 146-1.

In this manner, regarding a sensing image $I_n$ obtained by the sensing of the sensing device 101-1 of FIG. 13, an exposure time is set in accordance with the amount of light of an NIR component of light reflected from the inspection target 1, and thus light having a band of the NIR component is properly captured as indicated by the spectral characteristics S6 and S7. Note that, here, light of an R component has a low level and is under-exposed.

Further, in this case, the light of the NIR component of the light reflected from the reference reflecting plate 20 has an excessively low level as indicated by the spectral characteristics S4 and S5, and is thus under-exposed.

On the other hand, in the sensing device 101-2, the light reflected from the reference reflecting plate 20 and the inspection target 1 is incident on the lens 141-2 and passes through the R filter 143-2, so that an image is formed on the sensor surface of the sensor 144-2. However, in a case where plants such as plants in a field are the inspection target 1, a reflectance in a visible region decreases, and thus a long exposure time is set in accordance with the amount of light of an R component by the exposure unit 142-2 in the sensing device 101-2 transmitting the light of the R component by the R filter 143-2.

In the sensing device 101-2, a characteristic of the R filter 143-2 is indicated by a spectral characteristic S8 and a spectral characteristic S10. In the spectral characteristics S8 and S10, the characteristic of the R filter 143-2 corresponds to a transmission characteristic of the R filter illustrated in B of FIG. 11. Note that the characteristic (spectral characteristic S2) of the reference reflecting plate 20 is superimposed on the spectral characteristic S8 with respect to the characteristic of the R filter 143-2. In addition, the characteristic (spectral characteristic S3) of the inspection target 1 is superimposed on the spectral characteristic S10 with respect to the characteristic of the R filter 143-2.

As indicated by the spectral characteristic S9 on which the characteristic (spectral characteristic S2) of the light reflected from the reference reflecting plate 20 is superimposed with respect to the characteristic of the R filter 143-2, the sensor 144-2 outputs light received by the sensor surface and reflected from the reference reflecting plate 20 as the level of a R component in a region (the target region T2 in FIG. 3) including the reference reflecting plate 20.

In addition, as indicated by a spectral characteristic S11 on which the characteristic (spectral characteristic S3) of the light reflected from the inspection target 1 is superimposed with respect to the characteristic of the R filter 143-2, the sensor 144-2 outputs light received by the sensor surface and reflected from the inspection target 1 as the level of an R component in a region (the target region T1 in FIG. 2) including the inspection target 1.

That is, a signal corresponding to the level of the R components is R data (R signal) obtained by sensing the regions including the reference reflecting plate 20 and the inspection target 1 by the sensing device 101-2. The signal processing unit 145-2 performs a process of rearranging data from the sensor 144-2, and the like and outputs data obtained as a result of the process through the I/F unit 146-2.

In this manner, regarding a sensing image $I_R$ obtained by the sensing of the sensing device 101-2 of FIG. 13, an exposure time is set in accordance with the amount of light of a R component of light reflected from the inspection target 1, and thus light having a band of the R component is properly captured as indicated by the spectral characteristics S10 and S11. Note that, here, light of an NIR component has a high level and is over-exposed.

Further, in this case, the light of the R component of the light reflected from the reference reflecting plate 20 has an excessively high level as indicated by the spectral characteristics S8 and S9, and is thus over-exposed.

As described above, in a case where a configuration of a single reference reflecting plate which corresponds to the above-described configuration during measurement of FIG. 1 is adopted, a difference between the reflectance of the inspection target 1 and the reflectance of the reference reflecting plate 20 is large for each measurement band, and thus it becomes difficult to set an optimal exposure time, which leads to a failure in the specification of a light source such as sunlight or significant deterioration of measurement accuracy.

(2) Configuration of Plurality of Reference Reflecting Plates

Next, a configuration in which a plurality of reference reflecting plates 20 are used which corresponds to the above-described configuration during measurement of FIG. 4, that is, a configuration of the present technology will be described.

Note that, even when a configuration of a plurality of reference reflecting plates is adopted, the inspection target 1 is plants in a field, and thus the characteristic thereof is the same as the characteristic illustrated in B of FIG. 12.

(Characteristics of Plurality of Reference Reflecting Plates)

Figure 14:
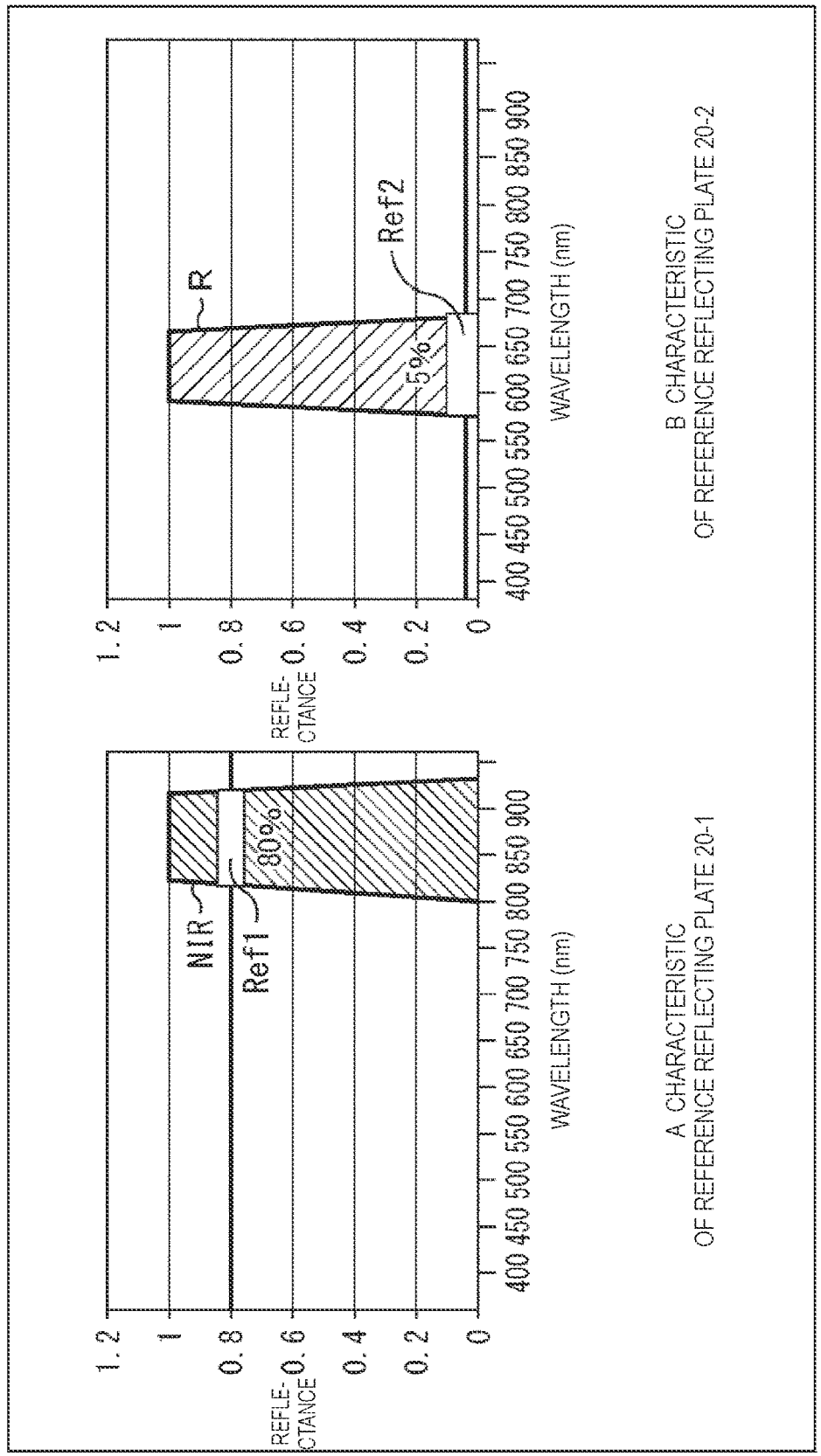
FIG. 14 is a diagram illustrating an example of characteristics of reference reflecting plates in a case where a configuration of a plurality of reference reflecting plates is adopted.

FIG. 14 is a diagram illustrating an example of characteristics of the reference reflecting plate 20-1 and the reference reflecting plate 20-2 in a case where a configuration of a plurality of reference reflecting plates is adopted.

A of FIG. 14 illustrates an example of a characteristic of the reference reflecting plate 20-1 (FIG. 4) when the horizontal axis represents a wavelength (nm) and the vertical axis represents a reflectance. As illustrated in A of FIG. 14, the reflectance of the reference reflecting plate 20-1 matches the reflectance in an infrared region (NIR) of the inspection target 1. For example, in A of FIG. 14, the reflectance of the reference reflecting plate 20-1 is set to 80% as indicated by "Ref1".

That is, in a case where the inspection target 1 is plants in a field, the reflectance thereof is the above-described characteristic illustrated in B of FIG. 12, and a reflectance in an infrared region (NIR) such as a range of 800 nm to 940 nm is approximately 0.8 (80%). Therefore, the reflectance of the reference reflecting plate 20-1 can be set to 80% in accordance with the reflectance in the infrared region (NIR) of the inspection target 1.

B of FIG. 14 illustrates an example of a characteristic of the reference reflecting plate 20-2 (FIG. 4) when the horizontal axis represents a wavelength (nm) and the vertical axis represents a reflectance. As illustrated in B of FIG. 14, the reflectance of the reference reflecting plate 20-2 matches the reflectance in red (R) of a visible region of the inspection target 1. For example, in B of FIG. 14, the reflectance of the reference reflecting plate 20-2 is set to 5% as indicated by "Ref2".

That is, in a case where the inspection target 1 is plants in a field, the reflectance thereof is the above-described characteristic illustrated in B of FIG. 12, and a reflectance in red (R) of a visible region such as a range of 580 nm to 680 nm is approximately 0.05 (5%). Therefore, the reflectance of the reference reflecting plate 20-2 can be set to 5% in accordance with the reflectance in red (R) of the visible region of the inspection target 1.

Note that, in a case where only a certain band is fixed as a transmission band in the sensing device 101-1 and the sensing device 101-2, reflectances in bands other than the band are treated as so-called "don't care". For example, bands other than the infrared region (NIR) in a case where the reference reflecting plate 20-1 is measured and bands other than red (R) in a visible region in a case where the reference reflecting plate 20-2 is measured are equivalent to such a band.

(Flow of Signal Processing During Measurement of Sensing Device)

Figure 15:
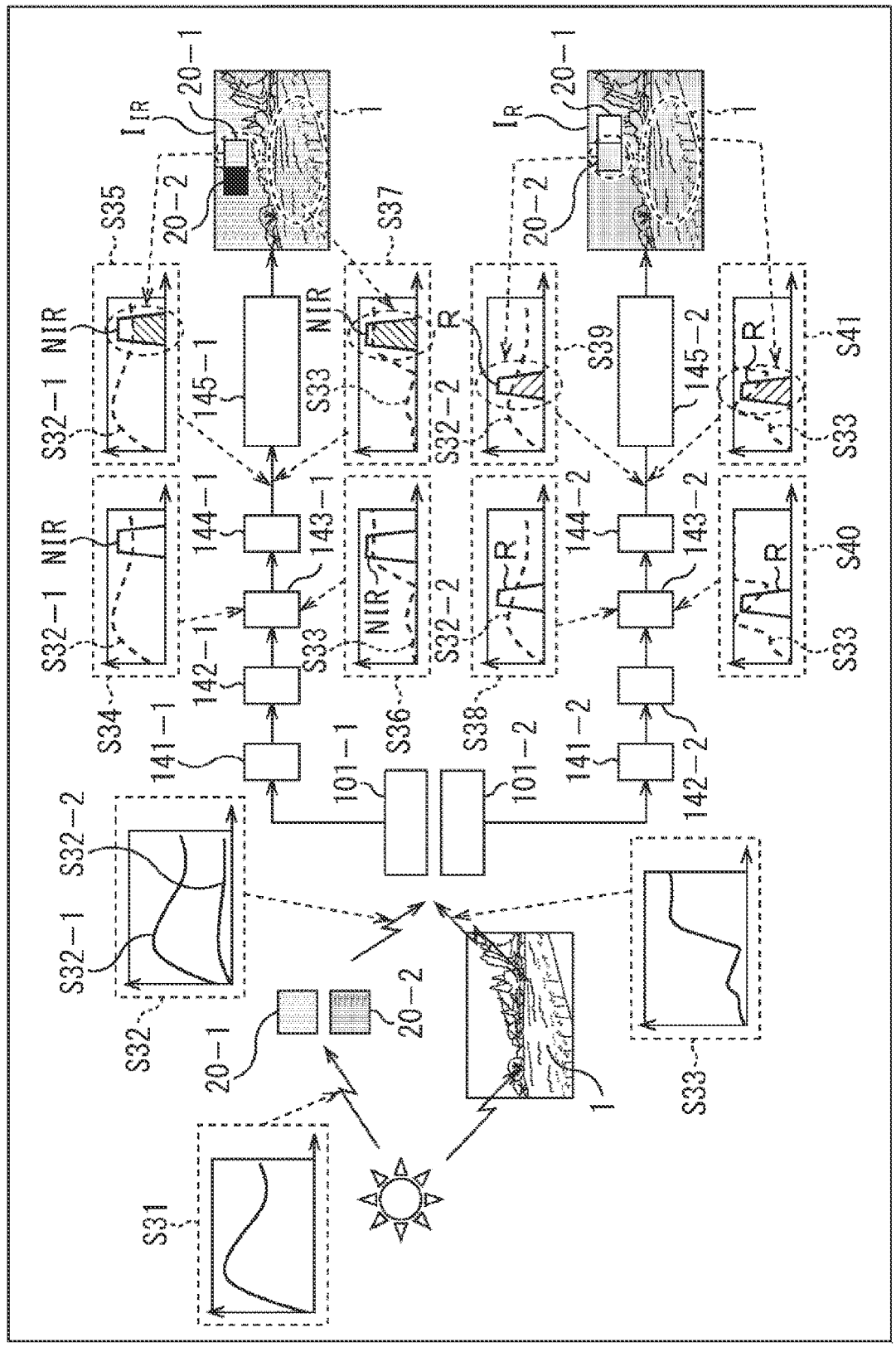
FIG. 15 is a diagram illustrating a flow of signal processing during measurement of sensing devices in a case where a configuration of a plurality of reference reflecting plates is adopted.

FIG. 15 is a diagram illustrating a flow of signal processing during measurement of the sensing device 101-1 and the sensing device 101-2 in a case where a configuration of a plurality of reference reflecting plates is adopted.

Note that, in FIG. 15, an upper sequence in the drawing shows a flow of a signal processed by the sensing device 101-1 having the NIR filter 143-1 attached thereto, and a lower sequence in the drawing shows a flow of a signal processed by the sensing device 101-2 having the R filter 143-2 attached thereto, similar to FIG. 13.

In FIG. 15, sunlight (environment light) is reflected from the reference reflecting plate 20-1 and the reference reflecting plate 20-2, and the reflected light is incident on the sensing device 101-1 and the sensing device 101-2. A spectral characteristic of the sunlight is indicated by a spectral characteristic S31. In addition, a spectral characteristic of the light reflected from the reference reflecting plate 20-1 and the reference reflecting plate 20-2 is indicated by a spectral characteristic S32.

That is, the reference reflecting plate 20-1 has the spectral characteristic illustrated in A of FIG. 14, and thus a spectral characteristic of the light reflected from the reference reflecting plate 20-1 is as indicated by a spectral characteristic S32-1. In addition, the reference reflecting plate 20-2 has the spectral characteristic illustrated in B of FIG. 14, and thus a spectral characteristic of the light reflected from the reference reflecting plate 20-2 is as indicated by a spectral characteristic S32-2.

Here, the reference reflecting plate 20-1 having a high reflectance characteristic (the spectral characteristic S32-1) in response to the NIR filter 143-1, out of the reference reflecting plate 20-1 and the reference reflecting plate 20-2, is used in the sensing of the sensing device 101-1. In addition, the reference reflecting plate 20-2 having a low reflectance characteristic (the spectral characteristic S32-2) in response to the R filter is used in the sensing of the sensing device 101-2.

In addition, the sunlight is reflected from the inspection target 1 such as plants in a field, and the reflected light is incident on the sensing device 101-1 and the sensing device

101-2. A spectral characteristic of the reflected light of the inspection target 1 is indicated by a spectral characteristic S33.

That is, when the spectral characteristic in FIG. 15 is compared with the spectral characteristic in FIG. 13, the spectral characteristic S31 of the sunlight is the same as the spectral characteristic S1 in FIG. 13. In addition, the spectral characteristic S33 of the inspection target 1 such as plants in a field is the same as the spectral characteristic S3 in FIG. 13, and has a reflection characteristic having a shape illustrated in B of FIG. 12. On the other hand, in FIG. 15, the plurality of reference reflecting plates 20-1 and 20-2 are prepared, and the spectral characteristics S32-1 and S32-2 of the reflected light thereof are different from the spectral characteristic S2 in FIG. 13.

In the sensing device 101-1, light reflected by the reference reflecting plate 20-1 and the inspection target 1 is incident on the lens 141-1 and passes through the NIR filter 143-1, so that an image is formed on the sensor surface of the sensor 144-1. However, in a case where plants such as plants in a field are the inspection target 1, a reflectance in an infrared region increases, and thus a short exposure time is set in accordance with the amount of light of an NIR component by the exposure unit 142-1 in the sensing device 101-1 transmitting the light of the NIR component by the NIR filter 143-1.

In the sensing device 101-1, a characteristic of the NIR filter 143-1 is indicated by a spectral characteristic S34 and a spectral characteristic S36. In the spectral characteristics S34 and S36, the characteristic of the NIR filter 143-1 corresponds to a transmission characteristic of the NIR filter illustrated in A of FIG. 11. Note that the characteristic (spectral characteristic S32-1) of the reference reflecting plate 20-1 is superimposed on the spectral characteristic S34 with respect to the characteristic of the NIR filter 143-1. In addition, the characteristic (spectral characteristic S33) of the inspection target 1 is superimposed on the spectral characteristic S36 with respect to the characteristic of the NIR filter 143-1.

As indicated by the spectral characteristic S35 on which the characteristic (spectral characteristic S32-1) of the light reflected from the reference reflecting plate 20-1 is superimposed with respect to the characteristic of the NIR filter 143-1, the sensor 144-1 outputs light received by the sensor surface and reflected from the reference reflecting plate 20-1 as the level of an NIR component in a region (the target region T3 in FIG. 5) including the reference reflecting plate 20.

In addition, as indicated by a spectral characteristic S37 on which the characteristic (spectral characteristic S33) of the light reflected from the inspection target 1 is superimposed with respect to the characteristic of the NIR filter 143-1, the sensor 144-1 outputs light received by the sensor surface and reflected from the inspection target 1 as the level of an NIR component in a region (the target region T1 in FIG. 5) including the inspection target 1.

That is, a signal corresponding to the level of the NIR components is NIR data (NIR signal) obtained by sensing the regions including the reference reflecting plate 20-1 and the inspection target 1 by the sensing device 101-1. The signal processing unit 145-1 performs a process of rearranging data from the sensor 144-1, and the like and outputs data obtained as a result of the process through the I/F unit 146-1.

In this manner, regarding a sensing image obtained by the sensing of the sensing device 101-1 of FIG. 15, an exposure time is set in accordance with the amount of light of an NIR component of light reflected from the inspection target 1, and thus light having a band of the NIR component is properly captured as indicated by the spectral characteristics S36 and S37. Note that, here, light of an R component has a low level and is under-exposed.

Further, in this case, regarding the light of the NIR component of the light reflected from the reference reflecting plate 20-1, light having a wavelength band of the NIR component is properly captured, as indicated by the spectral characteristics S34 and S35. Here, the reference reflecting plate 20-1 is prepared in advance so that the reflectance thereof matches the reflectance in an infrared region (NIR) of the inspection target 1. The sensing device 101-1 including the NIR filter 143-1 uses the reference reflecting plate 20-1 as light source information, and thus it is possible to properly capture light having a wavelength band of the NIR component not only with respect to light reflected from the inspection target 1 but also with respect to light reflected from the reference reflecting plate 20-1.

On the other hand, in the sensing device 101-2, the light reflected from the reference reflecting plate 20-2 and the inspection target 1 is incident on the lens 141-2 and passes through the R filter 143-2, so that an image is formed on the sensor surface of the sensor 144-2. However, in a case where plants such as plants in a field are the inspection target 1, a reflectance in a visible region decreases, and thus a long exposure time is set in accordance with the amount of light of an R component by the exposure unit 142-2 in the sensing device 101-2 transmitting the light of the R component by the R filter 143-2.

In the sensing device 101-2, a characteristic of the R filter 143-2 is indicated by a spectral characteristic S38 and a spectral characteristic S40. In the spectral characteristics S38 and S40, the characteristic of the R filter 143-2 corresponds to a transmission characteristic of the R filter illustrated in B of FIG. 11. Note that the characteristic (spectral characteristic S32-2) of the reference reflecting plate 20-2 is superimposed on the spectral characteristic S38 with respect to the characteristic of the R filter 143-2. In addition, the characteristic (spectral characteristic S33) of the inspection target 1 is superimposed on the spectral characteristic S40 with respect to the characteristic of the R filter 143-2.

As indicated by the spectral characteristic S39 on which the characteristic (spectral characteristic S32-2) of the light reflected from the reference reflecting plate 20-2 is superimposed with respect to the characteristic of the R filter 143-2, the sensor 144-2 outputs light received by the sensor surface and reflected from the reference reflecting plate 20-2 as the level of a R component in a region (the target region T4 in FIG. 6) including the reference reflecting plate 20-2.

In addition, as indicated by a spectral characteristic S41 on which the characteristic (spectral characteristic S33) of the light reflected from the inspection target 1 is superimposed with respect to the characteristic of the R filter 143-2, the sensor 144-2 outputs light received by the sensor surface and reflected from the inspection target 1 as the level of an R component in a region (the target region T1 in FIG. 6) including the inspection target 1.

That is, a signal corresponding to the level of the R components is R data (R signal) obtained by sensing the regions including the reference reflecting plate 20-2 and the inspection target 1 by the sensing device 101-2. The signal processing unit 145-2 performs a process of rearranging data from the sensor 144-2, and the like and outputs data obtained as a result of the process through the I/F unit 146-2.

In this manner, regarding a sensing image $I_R$ obtained by the sensing of the sensing device 101-2 of FIG. 15, an exposure time is set in accordance with the amount of light of a R component of light reflected from the inspection target 1, and thus light having a band of the R component is properly captured as indicated by the spectral characteristics S40 and S41. Note that, here, light of an NIR component has a high level and is over-exposed.

Further, in this case, regarding the light of the R component of the light reflected from the reference reflecting plate 20-2, light having a wavelength band of the R component is properly captured, as indicated by the spectral characteristics S38 and S39. Here, the reference reflecting plate 20-2 is prepared in advance so that the reflectance thereof matches the reflectance in red (R) in a visible region of the inspection target 1. The sensing device 101-2 including the R filter 143-2 uses the reference reflecting plate 20-2 as light source information, and thus it is possible to properly capture light having a wavelength band of the R component not only with respect to light reflected from the inspection target 1 but also with respect to light reflected from the reference reflecting plate 20-2.

As described above, in a case where a configuration of a plurality of reference reflecting plates which corresponds to the above-described configuration during measurement of FIG. 4 is adopted, both NIR components of light reflected from the inspection target 1 and the reference reflecting plate 20-1 fall within a dynamic range as light having a wavelength band of an NIR component in the sensing device 101-1. Further, in the sensing device 101-2, both R components of light reflected from the inspection target 1 and the reference reflecting plate 20-2 fall within a dynamic range as light having a wavelength band of an R component.

In this manner, in a case where a configuration of a plurality of reference reflecting plates is adopted, a difference between the reflectance of the inspection target 1 and the reflectance of the reference reflecting plate 20-1 or the reference reflecting plate 20-2 decreases for each measurement band in the sensing device 101-1 and the sensing device 101-2. As a result, it is possible to specify a light source and to capture a reflectance in a measurement wavelength of the inspection target 1 with high accuracy.

4. Inspection Index Measurement Process

In the above-described configuration of a plurality of reference reflecting plates, index measurement data obtained by the sensing of the sensing device 101-1 and the sensing device 101-2 is output to the index computational device 103 through the hub 103. The index computational device 103 calculates an inspection index (NDVI value) of the inspection target 1 on the basis of the index measurement data. Consequently, next, a flow of the overall inspection index measurement process executed by the index computational system 10 of FIG. 7 will be described with reference to a flowchart of FIG. 16.

In step S101, the sensing device 101-1 and the sensing device 101-2 perform exposure control in accordance with remote control from the control unit 172 of the index computational device 103. Here, an exposure time is determined in accordance with a measurement wavelength of the inspection target 1. Here, an exposure time is determined in accordance with a measurement wavelength of the inspection target 1.

For example, in a case where plants such as plants in a field are the inspection target 1, a reflectance in an infrared region increases, and thus control is performed so that an exposure time is reduced in accordance with the amount of light of an NIR component in the sensing device 101-1 including the NIR filter 143-1. In addition, regarding the plants, a reflectance in a visible region decreases, and thus control is performed so that an exposure time is increased in accordance with the amount of light of an R component in the sensing device 101-2 including the R filter 143-2.

In step S102, the sensing device 101-1 and the sensing device 101-2 perform sensing in accordance with the exposure control performed in the process of step S101. Here, as illustrated in FIG. 15, light having a wavelength band of the NIR component from the inspection target 1 and the reference reflecting plate 20-1 is sensed by the sensing device 101-1, and light having a wavelength band of the R component from the inspection target 1 and the reference reflecting plate 20-2 is sensed by the sensing device 101-2.

In step S103, the processing unit 162 of the index computational device 103 acquires the index measurement data obtained in the process of step S102 through the hub 104.

In step S104, the calculation unit 171 of the index computational device 103 adjusts a gain between the sensing device 101-1 and the sensing device 101-2 with respect to the index measurement data acquired in the process of step S103. Here, the adjustment of a gain based on a difference in an exposure time between the sensing device 101-1 and the sensing device 101-2 is performed.

For example, in a case where an exposure time based on the amount of light of the NIR component in the sensing device 101-1 is 10 ms, the level of an R signal obtained from the sensing device 101-2 may be set to ¼ when an exposure time based on the amount of light of an R component in the sensing device 101-2 is 40 ms.

In step S105, the calculation unit 171 of the index computational device 103 specifies a processing area from a sensing image corresponding to the index measurement data having been subjected to gain adjustment in the process of step S104. Here, as the processing area, a region including the inspection target 1 (for example, a region equivalent to the target region T1 in FIG. 5 or FIG. 6), a region including the reference reflecting plate 20-1 (for example, a region equivalent to the target region T3 in FIG. 5), and a region including the reference reflecting plate 20-2 (for example, a region equivalent to the target region T4 in FIG. 6) which are included in the sensing image (for example, the sensing image in FIG. 5 or the sensing image $I_R$ in FIG. 6) are specified.

In step S106, the calculation unit 171 of the index computational device 103 calculates a correction gain on the basis of results of the processes of steps S104 and S105.

Here, an NIR signal is generated by averaging the level of the region of the reference reflecting plate 20-1 included in the sensing image obtained by the sensing device 101-1 (a region equivalent to the target region T3 in FIG. 5). In addition, an R signal is generated by averaging the level of the region (a region equivalent to the target region T4 in FIG. 6) of the reference reflecting plate 20-2 included in the sensing image $I_R$ obtained by the sensing device 101-2. However, the level of the R signal is ¼ in a case of the above-described example in consideration of an exposure time.

In addition, the level of the R signal is multiplied by a reference plate reflection coefficient (C) in consideration of the reflectances of the reference reflecting plate 20-1 and the reference reflecting plate 20-2. However, the reference plate reflection coefficient (C) is obtained by the following Expression (2). For example, in a case where the reflectance of the reference reflecting plate 20-1 is 80% and the reflectance of the reference reflecting plate 20-2 is 5%, the level of the R signal is multiplied by 16 (=0.8/0.05).

$$C = \frac{\text{reflectance@reference plate 1}}{\text{reflectance@reference plate 2}} \qquad (2)$$

However, in Expression (2), "C" represents a reference plate reflection coefficient. In addition, "reflectance@reference plate 1" represents the reflectance of the reference reflecting plate 20-1, and "reflectance@reference plate 2" represents the reflectance of the reference reflecting plate 20-2.

It is possible to ascertain a spectral characteristic of incident light by obtaining a ratio (Red/NIR) of the R signal to the NIR signal obtained in this manner. In addition, a reciprocal of the ratio is a correction gain (G). That is, the correction gain (G) is obtained by the following Expression (3). That is, it is possible to measure a reflectance spectral characteristic of the inspection target 1 by examining the intensity of the reflected light of the inspection target 1 when a light source having a flat reflectance is input.

$$G = 1/(\text{Red@reference plate 2}/\text{NIR@reference plate 1}) \times (\text{reflectance@reference plate 2}/\text{reflectance@reference plate 1}) \qquad (3)$$

However, in Expression (3), "G" represents a correction gain. In addition, "Red@reference plate 2" represents an R signal obtained by sensing the reference reflecting plate 20-2 by the sensing device 101-2, and "NIR@reference plate 1" represents an NIR signal obtained by sensing the reference reflecting plate 20-1 by the sensing device 101-1. Further, "reflectance@reference plate 2" represents the reflectance of the reference reflecting plate 20-2, and "reflectance@reference plate 1" represents the reflectance of the reference reflecting plate 20-1.

In step S107, the calculation unit 171 of the index computational device 103 corrects data in a region including the inspection target 1 which is specified by the process of step S105 using the correction gain calculated in the process of step S106.

Here, for example, an NIR component of each pixel in a region of the inspection target 1 included in the sensing image obtained by the sensing device 101-1 (a region equivalent to the target region T1 in FIG. 5) and an R component of each pixel in a region of the inspection target 1 included in the sensing image $I_R$ obtained by the sensing device 101-2 (a region equivalent to the target region T1 in FIG. 6) are extracted. However, the level of the R signal is ¼ in the above-described case in consideration of an exposure time.

In addition, it is possible to correct the data in the region including the inspection target 1 by multiplying a ratio (Red/NIR) of the R signal of each pixel to the NIR signal which are extracted in this manner by the correction gain (G). The corrected value (A) is obtained by the following Expression (4).

$$A = G \times (\text{Red@object}/\text{NIR@object}) \qquad (4)$$

However, in Expression (4), "A" represents a corrected value, and "G" represents a correction gain. In addition, "Red@object" represents an R signal obtained by sensing a region including the inspection target 1 by the sensing device 101-2, and "NIR@object" represents an NIR signal obtained by sensing a region including the inspection target 1 by the sensing device 101-1.

In step S108, the calculation unit 171 of the index computational device 103 calculates a vegetation index as an inspection index of the inspection target 1 using the corrected value (A) obtained in the process of step S107.

Here, it is possible to calculate an NDVI value as a vegetation index. The NDVI value can be obtained by Expression (1) described above, but can be represented as the following Expression (5) in a case where the corrected value (A) obtained in the process of step S107 is used.

$$NDVI = (1-A)/(1+A) \qquad (5)$$

In step S109, the calculation unit 171 of the index computational device 103 stores data of the vegetation index (NDVI value) calculated in the process of step S108 in the storage unit 163.

In step S110, it is determined whether or not to terminate the processing. In step S110, in a case where it is determined that the processing is not terminated, the processing returns to step S101 and the subsequent processes are repeated. On the other hand, in a case where it is determined in step S110 that the processing is terminated, the inspection index measurement process of FIG. 16 is terminated.

A flow of the inspection index measurement process has been described above.

Figure 16:
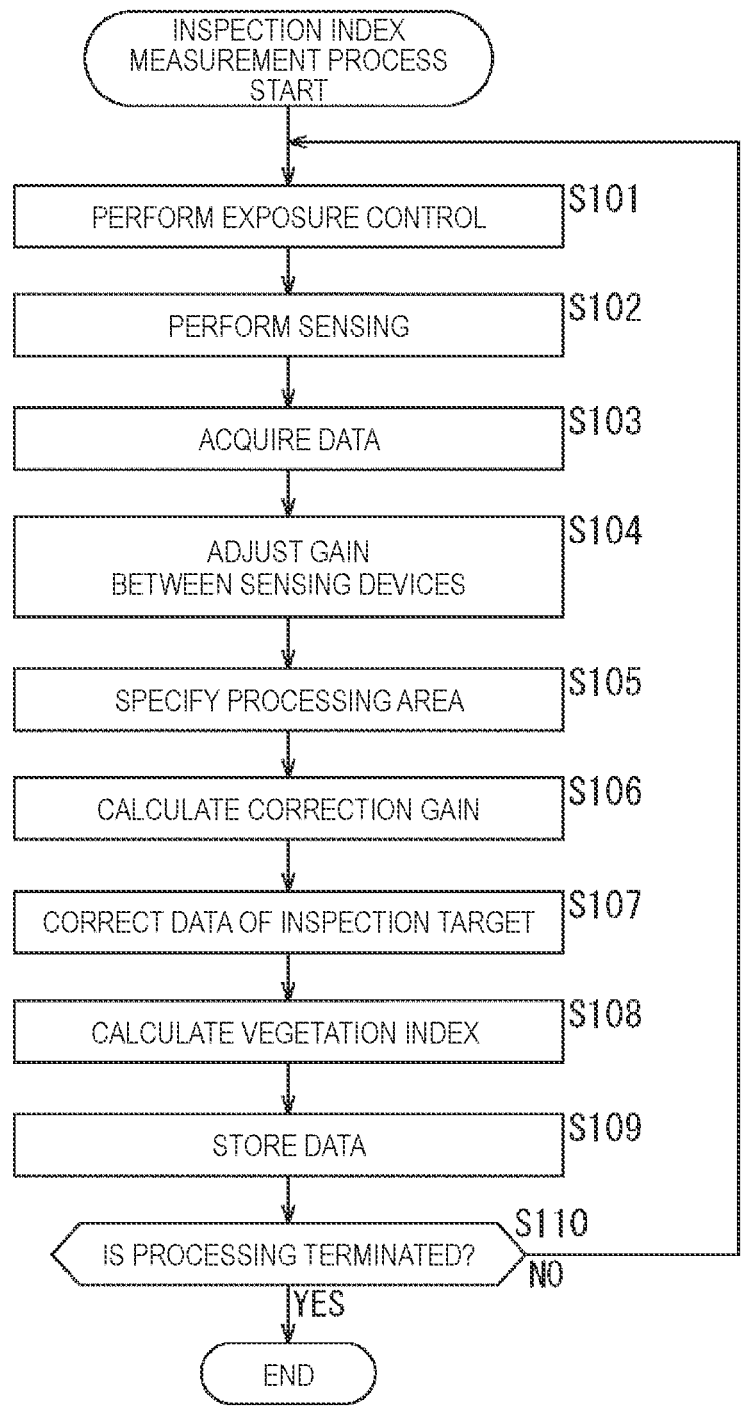
FIG. 16 is a flowchart illustrating a flow of an inspection index measurement process.

Note that, in the description of FIG. 16, in the inspection index measurement processes, the processes of steps S101 to S102 are executed by the sensing device 101-1 and the sensing device 101-2, and the processes of steps S103 to S110 are executed by the index computational device 103, but the processes of steps S103 to S110 may be executed by a device, such as the sensing device 101, other than the index computational device 103. Further, in a case where a configuration of the index computational system 11 (FIG. 10) as a cloud environment is adopted rather than a configuration of the index computational system 10 (FIG. 7) as a local environment, for example, the server 109 can execute the processes of steps S103 to S110.

5. Modification Example (Another Example of Reference Reflecting Plate)

In the above description, a reference reflecting plate having a plate shape is used as the plurality of reference reflecting plates 20, but the reference reflecting plate is not limited to a plate shape and may be a predetermined region (reference reflection region) having characteristics corresponding to the inspection target 1. For example, as the reference reflection region, a configuration can be adopted in which a region of a surface of one plate is divided into two regions, so that one region has a reflectance matching the reflectance in an infrared region (NIR) of the inspection target 1 and the other region has a reflectance matching the reflectance of red (R) in a visible region of the inspection target 1.

Further, in the above, a configuration in which only one reference reflecting plate 20 is provided with respect to one wavelength band (measurement band) has been described, but a plurality of reference reflecting plates 20 (reference reflection regions) may be provided with respect to one wavelength band (measurement band). Regarding the plurality of reference reflecting plates 20 (reference reflection regions) provided in this manner, for example, reflectances, and angles and positions with respect to the sensing device 101 (sensor 144) may be different from each other.

In addition, as illustrated in FIG. 4, the reference reflecting plate 20 can be fixed in front of the sensing device 101 by means of a predetermined member, but a mechanism capable of varying an attachment angle of the reference reflecting plate 20 with respect to the sensing device 101 (sensor 144) may be provided. Thereby, for example, it is possible to adjust an angle of the reference reflecting plate 20 with respect to the sensing device 101 (sensor 144) in accordance with the reflection state of the reference reflecting plate 20.

(Case where there is One Sensing Device)

Further, in the above description, a plurality of sensors 144 (the sensor 144-1 of the sensing device 101-1 and the sensor 144-2 of the sensing device 101-2) are provided with respect to a plurality of reference reflecting plates 20 (the reference reflecting plates 20-1 and 20-2), but it is not necessary to provide the sensors 144 corresponding to the number of reference reflecting plates 20.

For example, one sensor 144 may be provided with respect to a plurality of reference reflecting plates 20, and the inspection target 1 and the reference reflecting plate 20 may be sensed a plurality of times for each measurement band of the inspection target 1 by one sensor 144 while shifting a time. Further, in addition to performing the sensing in time division, for example, as described above in FIG. 8, the sensor 144 has an arrangement pattern including at least an R pixel and an IR pixel, so that it is possible to simultaneously obtain an R signal and an NIR signal by one sensing.

(Another Example of Measurement Device)

Figure 17:
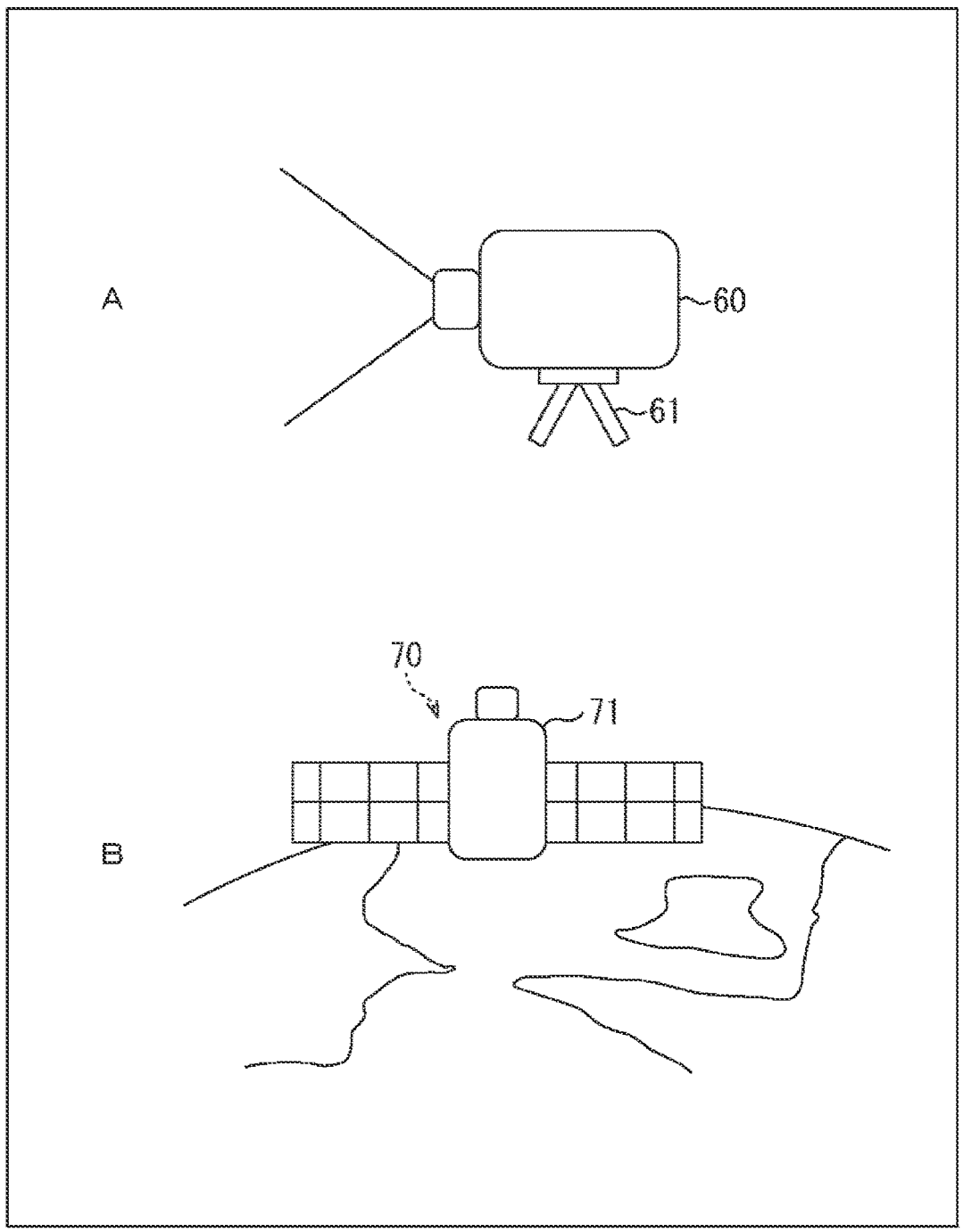
FIG. 17 is a diagram illustrating another configuration example of a measurement device.

Although the mobile measuring device 50 (FIG. 4 and the like) performing movement observation has been described above, a measurement device is not limited to the mobile measuring device 50, and other measurement devices such as a fixed-point measurement device performing fixed-point observation may be used. FIG. 17 illustrates a fixed-point measurement device 60 performing fixed-point observation and a satellite measurement device 70 performing measurement from an artificial satellite as other examples of a measurement device.

The fixed-point measurement device 60 illustrated in A of FIG. 17 is fixed at a position where the inspection target 1 (for example, plants in a field) can be sensed (imaged) by a fixing leg 61, and outputs index measurement data measured at the position to the index computational device 103 through the hub 104. The index computational device 103 processes the index measurement data output from the fixed-point measurement device 60, so that it is possible to obtain an index (NDVI value) of the inspection target 1 having been subjected to fixed-point measurement by the fixed-point measurement device 60.

The satellite measurement device 70 illustrated in B of FIG. 17 is built into an artificial satellite 71. In the artificial satellite 71, index measurement data (for example, a measurement value based on a satellite image) obtained by the measurement (imaging performed by the artificial satellite 71) of the satellite measurement device 70 is transmitted to the index computational device 103 through a predetermined communication route. The index computational device 103 processes the index measurement data transmitted from the satellite measurement device 70, so that it is possible to obtain an inspection index (NDVI value) of the inspection target 1 measured by the artificial satellite 71.

Note that, in a case where processing is performed in the cloud environment illustrated in FIG. 10 instead of the local environment illustrated in FIG. 7, index measurement data from the fixed-point measurement device 60 or the satellite measurement device 70 is provided to the server 109, so that the server 109 processes the index measurement data to calculate an inspection index (NDVI value) of the inspection target 1.

Further, in a configuration of a multi sensing system (multi camera system) in which a plurality of sensing devices 101 (cameras) communicably connected to each other are synchronized with each other to be capable of performing sensing (imaging), it is not necessary to provide the same number of reference reflecting plates 20 as the plurality of sensing devices 101 in the multi sensing system, and it is possible to adopt, for example, a configuration in which the reference reflecting plate 20 is provided only for any sensing device 101. In this case, index measurement data obtained by any sensing device 101 is transmitted to another sensing device 101 as metadata.

(Other Vegetation Indexes)

Further, in the above, a normalized difference vegetation index (NDVI value) which is an inspection index when plants are set to be the inspection target 1 has been described as an example, but vegetation indexes other than the normalized difference vegetation index (NDVI value) may be measured. For example, as other vegetation indexes, a Ratio Vegetation Index (RVI), a Difference Vegetation Index (DVI), and the like can be used.

Here, the ratio vegetation index (RVI value) is calculated by computationally calculating the following Expression (6).

$$RVI=IR/R \qquad (6)$$

In addition, the difference vegetation index (DVI value) is calculated by computationally calculating the following Expression (7).

$$DVI=IR-R \qquad (7)$$

However, in Expression (6) and Expression (7), IR represents a reflectance in an infrared region, and R represents a reflectance of red in a visible region. Note that, here, only vegetation indexes having IR and R as parameters are illustrated, but it is of course possible to measure other vegetation indexes using reflectances of light in visible regions other than red, and the like as parameters. Such a spectrum ratio is not limited to a combination of R and IR. Components in other wavelength bands, such as G and B, other than R and IR may be output from the sensor 144 as an output of RGBIR.

(Configuration Using Element Other than Reference Reflecting Plate)

In the above, a case where a plurality of reference reflecting plates 20 having a reflectance corresponding to the inspection target 1 are prepared for each wavelength band (measurement band) and the inspection target 1 and the reference reflecting plate 20 are sensed for each measurement band has been described, but a configuration in which an element other than the reference reflecting plate 20 is used may be adopted. For example, FIG. 18 illustrates a configuration in a case where a reference transmission plate 80 having a transmissivity corresponding to the inspection target 1 is used instead of the reference reflecting plate 20.

Figure 18:
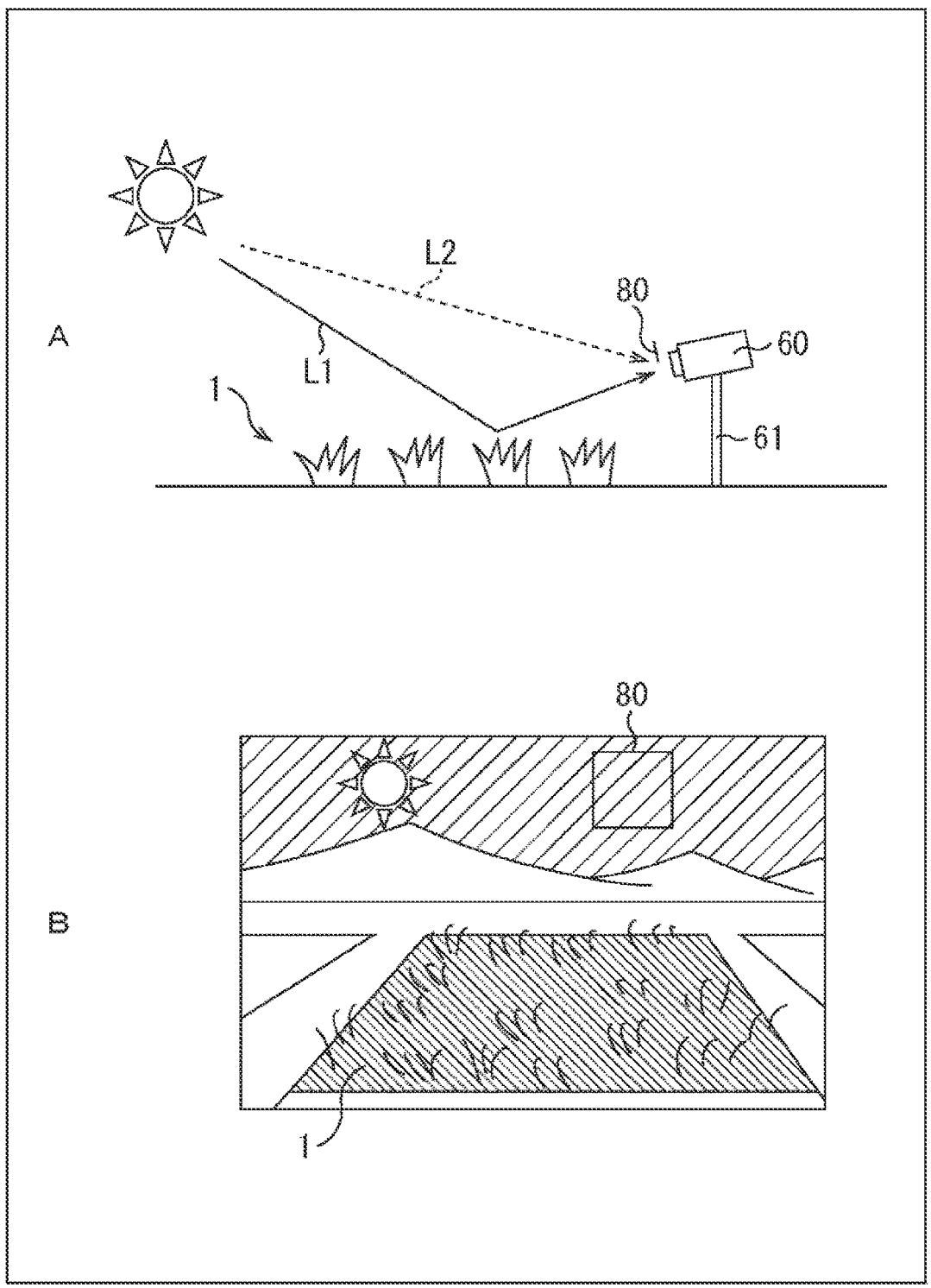
FIG. 18 is a diagram illustrating an example of a configuration in a case where a reference transmission plate is used.

In A of FIG. 18, the fixed-point measurement device 60 is fixed to a position where the inspection target 1 (for example, plants in a field) can be sensed by the fixing leg 61. In addition, the reference transmission plate 80 is installed in front of the fixed-point measurement device 60 by a predetermined member. For example, as illustrated in B of FIG. 18, when the plants and the sky are set to appear within the same angle of view, the reference transmission plate 80 is installed in a portion where the sky appears.

That is, since a region in which the reference transmission plate 80 is installed has a purpose of confirming the state of sunlight (environment light), light (reflected light) reflected by the plants as indicted by a path L1 illustrated in A of FIG. 18 should not be incident, and light as indicated by a path L2 illustrated in A of FIG. 18 needs to be incident. An inspection index of the inspection target 1 can be calculated using index measurement data obtained in this manner. However, in a case where the reference transmission plate 80 is used, reflected light from such as the plants is incident, which leads to a likelihood that disturbance is caused. On the other hand, in a case where the reference reflecting plate 20 is used, the influence of such noise is not exerted.

Note that, in FIG. 18, for convenience of description, a case where one reference transmission plate 80 is provided has been illustrated, but a reference transmission plate 80 having a region corresponding to red (R) and a reference transmission plate 80 having a region corresponding to an infrared region (NIR) are actually provided. However, the reference transmission plate 80 may be a predetermined region (reference transmission region) which is obtained, for example, by dividing a region of a surface of one plate into two regions, one of which is a region corresponding to red (R) and the other of which is a region corresponding to an infrared region (NIR).

Further, in FIG. 18, a case where fixed-point observation is performed by the fixed-point measurement device 60 has been illustrated, but the reference transmission plate 80 may be provided in the mobile measuring device 50 (FIG. 4 and the like) performing movement observation and a region including the inspection target 1 such as plants in a field may be sensed (aerial imaging) from the sky. Further, in FIG. 18, a configuration in which the reference transmission plate 80 is installed on the outer side of the fixed-point measurement device 60, that is, on the outer side of a camera module has been illustrated, but a configuration in which a portion of an optical system (optical element) such as a lens within the camera module plays a role as a reference transmission plate may be adopted. By adopting such a configuration, there is an effect that it is not necessary to provide a member on the outer side of the fixed-point measurement device 60.

6. Configuration of Computer

Figure 19:
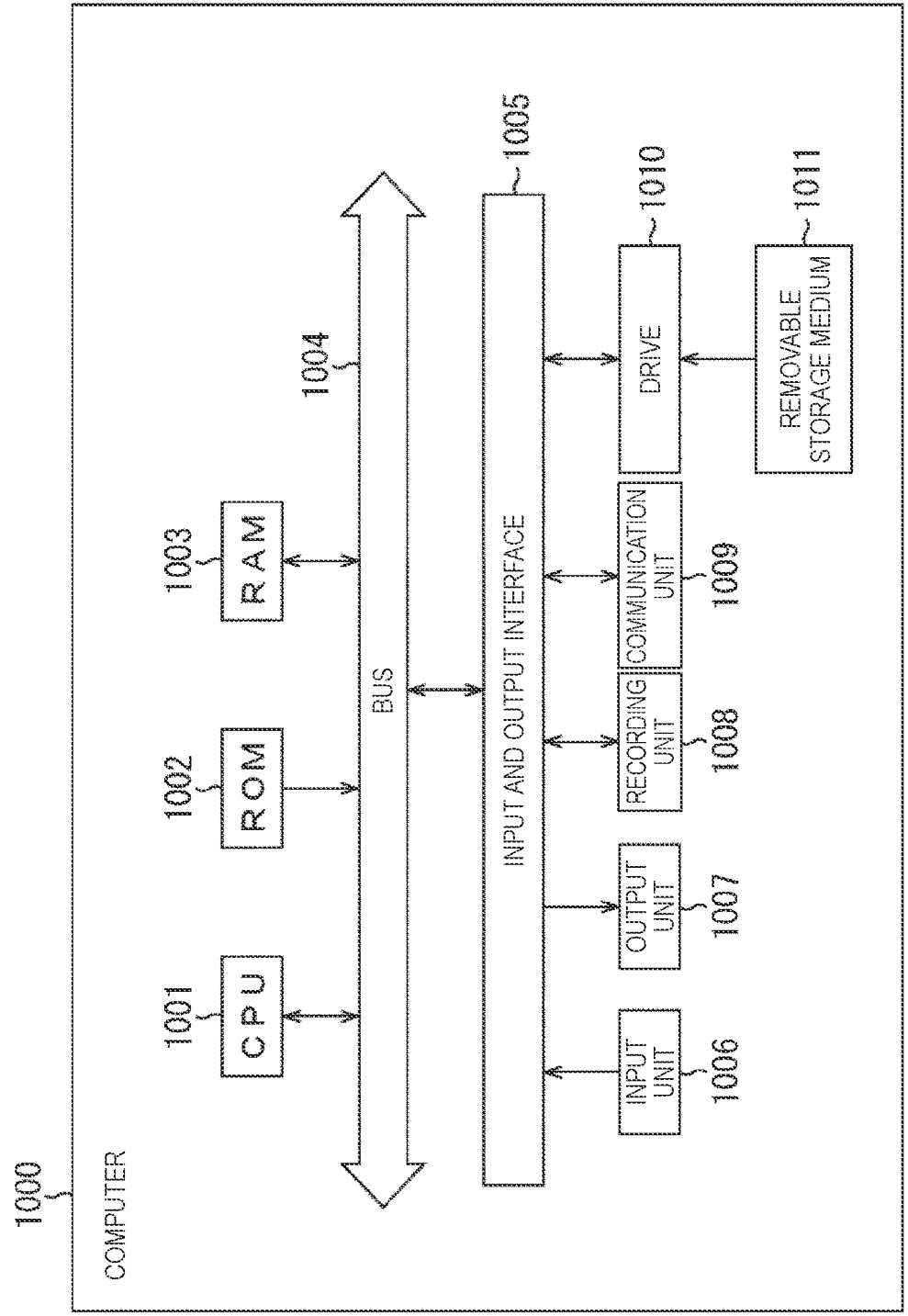
FIG. 19 is a diagram illustrating a configuration example of a computer.

The above-described series of processes (the processes of steps S104 to S108 in the inspection index measurement process of FIG. 16) may be executed by hardware or software. In a case in which the series of processes is executed by software, a program including the software is installed on a computer. FIG. 19 is a diagram illustrating an example of a hardware configuration of a computer in which the above-described series of processes is executed by the program.

In a computer 1000, a central processing unit (CPU) 1001, a read-only memory (ROM) 1002, and a random access memory (RAM) 1003 are connected to each other by a bus 1004. An input and output interface 1005 is further connected to the bus 1004. An input unit 1006, an output unit 1007, a recording unit 1008, a communication unit 1009, and a drive 1010 are connected to the input and output interface 1005.

A keyboard, a mouse, a microphone, or the like is used as the input unit 1006. A display, a speaker, or the like is used as the output unit 1007. A hard disk, a nonvolatile memory, or the like is used as the recording unit 1008. A network interface or the like is used as the communication unit 1009. The drive 1010 drives the storage medium 1011 such as a magnetic disk, an optical disc, a magneto-optical disc, or a semiconductor memory.

In the computer 1000 that has the above-described configuration, the CPU 1001 executes the above-described series of processes by loading a program recorded on the ROM 1002 or the recording unit 1008 to the RAM 1003 via the input and output interface 1005 and the bus 1004 and executing the program.

The program executed by the computer 1000 (the CPU 1001) can be recorded on, for example, the removable storage medium 1011 such as a package medium for supply. In addition, the program can be supplied via a wired or wireless transmission medium such as a local area network, the Internet, or digital broadcasting.

In the computer 1000, the program can be installed on the recording unit 1008 via the input and output interface 1005 by mounting the removable storage medium 1011 on the drive 1010. In addition, the program can be received by the communication unit 1009 via a wired or wireless transmission medium and can be installed on the recording unit 1008. Additionally, the program can be installed in advance on the ROM 1002 or the recording unit 1008.

Here, in the present specification, processes executed by the computer in accordance with the program may not necessarily be executed chronologically in the order described as a flowchart. That is, the processes executed by the computer in accordance with the program also include processes executed in parallel or individually (for example, parallel processes or processes by objects). In addition, the program may be processed by one computer (processor) or may be distributed and processed by a plurality of computers.

Moreover, embodiments of the present technology are not limited to the above-described embodiments, but various changes can be made within the scope of the present technology without departing from the gist of the present technology. For example, an embodiment in which all or some of the plurality of the above-mentioned embodiments are combined, may be adopted.

Additionally, the present technology may also be configured as below.

(1)

A sensing system including:

a sensor which senses a plurality of reference reflection regions having characteristics according to an inspection target, corresponding to a plurality of wavelength bands which are targets for sensing of the inspection target, and having different reflectances, and a region including the inspection target.

(2)

The sensing system according to (1), further including:

a calculation unit which calculates an inspection index of the inspection target on a basis of a measurement result obtained through the sensing performed by the sensor.

(3)

The sensing system according to (1) or (2), in which the sensor includes a plurality of sensors corresponding to the plurality of wavelength bands.

(4)

The sensing system according to any of (1) to (3), in which the sensor simultaneously senses the region including the inspection target and the reference reflection regions.

(5)

The sensing system according to any of (1) to (4), further including: a control unit which controls an exposure time of the sensor for each wavelength band which is a target for sensing of the inspection target.

(6)

The sensing system according to (2), in which the calculation unit calculates the inspection index on a basis of measurement spectral information regarding the inspection target obtained for each wavelength band which is a target for sensing of the inspection target.

(7)

The sensing system according to (6), in which the calculation unit corrects the measurement spectral information regarding the inspection target on a basis of measurement spectral information regarding the reference reflection region obtained for each wavelength band which is a target for sensing of the inspection target and the reflectances of the reference reflection regions.

(8)

The sensing system according to (7), in which the inspection target is a plant, and the inspection index is a normalized difference vegetation index (NDVI).

(9)

The sensing system according to any of (1) to (8), including:

a sensing device which includes the sensor.

(10)

The sensing system according to (2), including:

a computational device which includes the calculation unit.

(11)

The sensing system according to any of (1) to (10), in which a dynamic range of the sensor is set to be a dynamic range corresponding to the wavelength band which is a target for sensing of the inspection target.

(12)

The sensing system according to (11), in which the sensor includes a plurality of sensors corresponding to the plurality of wavelength bands, and each of dynamic ranges of the plurality of sensors is set to be a dynamic range corresponding to the wavelength band which is a target for sensing.

(13)

The sensing system according to (12), in which the dynamic ranges of the plurality of sensors are set to be different ranges.

(14)

A sensing method for a sensing system including a sensor, the sensing method including:

a step of causing the sensor to sense a plurality of reference reflection regions having characteristics according to an inspection target, corresponding to a plurality of wavelength bands which are targets for sensing of the inspection target, and having different reflectances, and a region including the inspection target.

(15)

A sensing device including:

a sensor which senses a plurality of reference reflection regions having characteristics according to an inspection target, corresponding to a plurality of wavelength bands which are targets for sensing of the inspection target, and having different reflectances, and a region including the inspection target.

(16)

A program causing a computer to function as a calculation unit which calculates an inspection index of the inspection target on a basis of a measurement result obtained through the sensing performed by a sensor which senses a plurality of reference reflection regions having characteristics according to an inspection target, corresponding to a plurality of wavelength bands which are targets for sensing of the inspection target, and having different reflectances, and a region including the inspection target.

REFERENCE SIGNS LIST 10, 11 Index computational system
20, 20-1, 20-1 Reference reflecting plate
101, 101-1, 101-2 Sensing device
103 Index computational device
105 Client device
108 Network
109 Server
110 Storage
121 Measurement unit
122 Processing unit
141, 141-1, 141-2 Lens
142, 142-1, 142-2 Exposure unit
143 Filter
143-1 NIR filter
143-2 R filter
144, 144-1, 144-2 Sensor
145, 141-5, 145-2 Signal processing unit
146 I/F unit
161 I/F unit
162 Processing unit
163 Storage unit
164 Display unit
171 Calculation unit
172 Control unit
1000 Computer
1001 CPU

The invention claimed is:

1. A sensing system comprising:
one or more reference plates; and
a sensor configured to
sense one or more reference reflection regions of the one or more reference plates, each of the one or more reference reflection regions having characteristics according to an inspection target, and
sense a region including the inspection target,
wherein the characteristics include a single fixed reflectance across a range of wavelengths.

2. The sensing system according to claim 1, further comprising:
an electronic processor configured to calculate an inspection index of the inspection target on a basis of a measurement result obtained through the sensing performed by the sensor.

3. The sensing system according to claim 1,
wherein the sensor includes a plurality of sensors corresponding to a plurality of wavelength bands.

4. The sensing system according to claim 1,
wherein the sensor is configured to simultaneously sense the region including the inspection target and the one or more reference reflection regions.

5. The sensing system according to claim 3, further comprising:
an electronic processor configured to control an exposure time of the sensor for each of the plurality of wavelength bands which is a target for sensing of the inspection target.

6. The sensing system according to claim 2,
wherein the electronic processor is further configured to calculate the inspection index on a basis of measurement spectral information regarding the inspection target obtained for each of a plurality of wavelength bands that is a target for sensing of the inspection target.

7. The sensing system according to claim 6,
wherein the electronic processor is further configured to correct the measurement spectral information regarding the inspection target on a basis of measurement spectral information regarding one or more of the one or more reference reflection regions obtained for the each of the plurality of wavelength bands which are the target for sensing of the inspection target and the reflectances of the plurality of reference reflection regions.

8. The sensing system according to claim 7,
wherein the inspection target is a plant, and
the inspection index is a normalized difference vegetation index (NDVI).

9. The sensing system according to claim 1, further comprising:
a sensing device that includes the sensor,
wherein the sensing device is an unmanned aerial vehicle.

10. The sensing system according to claim 2, further comprising:
a computational device that includes the electronic processor.

11. The sensing system according to claim 1,
wherein a dynamic range of the sensor corresponds to one of a plurality of wavelength bands that is a target for sensing of the inspection target.

12. The sensing system according to claim 11,
wherein the sensor includes a plurality of sensors corresponding to the plurality of wavelength bands, and
wherein an individual dynamic range of each sensor of the plurality of sensors corresponds to the one of the plurality of wavelength bands that is the target for sensing.

13. The sensing system according to claim 12,
wherein each individual dynamic range of the each sensor of the plurality of sensors is different from other dynamic ranges of the plurality of sensors.

14. A sensing method for a sensing system including a sensor, the sensing method comprising:
sensing, with the sensor, one or more reference reflection regions of one or more reference plates, the one or more reference reflection regions having characteristics according to an inspection target; and
sensing, with the sensor, a region including the inspection target,
wherein the characteristics include a single fixed reflectance across a range of wavelengths.

15. A sensing device comprising:
a sensor configured to
sense one or more reference reflection regions of one or more reference plates, the one or more reference reflection regions having characteristics according to an inspection target, and
sense a region including the inspection target,
wherein the characteristics include a single fixed reflectance across a range of wavelengths.

16. The sensing device according to claim 15, further comprising:
an electronic processor configured to calculate an inspection index of the inspection target on a basis of a measurement result obtained through the sensing performed by the sensor.

17. The sensing device according to claim 15, further comprising:
an unmanned aerial vehicle housing,
wherein the sensor has a field-of-view, wherein the one or more reference plates are a fixed distance from the sensor and within the field-of-view, and wherein the one or more reference plates are affixed to the unmanned aerial vehicle housing.

18. The sensing system according to claim 1, further comprising:
an unmanned aerial vehicle housing,
wherein the sensor has a field-of-view, wherein the one or more reference plates are a fixed distance from the sensor and within the field-of-view, and wherein the one or more reference plates are affixed to the unmanned aerial vehicle housing.

19. The sensing system according to claim 1, wherein the single fixed reflectance is a first reflectance, wherein the inspection target has a second reflectance, and wherein the second reflectance is greater than the first reflectance.

20. The sensing system according to claim 1, wherein the single fixed reflectance is a reflectance of 18%, and wherein the range of wavelengths is a range between 350 nanometers (nm) and 950 nm.

21. The sensing system according to claim 1, wherein the single fixed reflectance of a first reference reflection region is a first reflectance of 80%,
wherein the range of wavelengths of the first reference reflection region is a near-infrared wavelength band between 800 nanometers (nm) and 950 nm,
wherein the single fixed reflectance of a second reference reflection region is a second reflectance of 5%, and
wherein the range of wavelengths of the second reference reflection region is a red wavelength band between 550 nm and 700 nm.

* * * * *